US010984142B2

(12) United States Patent
Norwood, IV

(10) Patent No.: US 10,984,142 B2
(45) Date of Patent: Apr. 20, 2021

(54) METHOD AND APPARATUS FOR A MODULAR JACK UP RIG ASSEMBLY

(71) Applicant: Electronic Power Design, Houston, TX (US)

(72) Inventor: John Norwood, IV, Houston, TX (US)

(73) Assignee: Electronic Power Design, Inc., Houston, TX (US)

( * ) Notice: Subject to any disclaimer, the term of this patent is extended or adjusted under 35 U.S.C. 154(b) by 627 days.

(21) Appl. No.: 14/447,522

(22) Filed: Jul. 30, 2014

(65) Prior Publication Data
US 2016/0227665 A1   Aug. 4, 2016

Related U.S. Application Data

(60) Provisional application No. 61/858,689, filed on Jul. 26, 2013, provisional application No. 61/859,867, filed on Jul. 30, 2013.

(51) Int. Cl.
*G06F 17/50* (2006.01)
*G06F 30/00* (2020.01)
*E02B 17/08* (2006.01)
*G06F 111/20* (2020.01)

(52) U.S. Cl.
CPC .............. *G06F 30/00* (2020.01); *E02B 17/08* (2013.01); *G06F 2111/20* (2020.01)

(58) Field of Classification Search
CPC ....................................................... G06F 17/50
USPC ............................................................. 713/1
See application file for complete search history.

(56) References Cited

U.S. PATENT DOCUMENTS

2009/0128558 A1* 5/2009 Morello .................. G06F 30/13
345/420

OTHER PUBLICATIONS

Bentec, Power Control Room, Mar. 15, 2013, pp. 1-2.*

* cited by examiner

*Primary Examiner* — Andy Ho
(74) *Attorney, Agent, or Firm* — G. Michael Roebuck, PC

(57) ABSTRACT

A system and method are disclosed for building a modular electrical system for a jack up rig, the method including but not limited to identifying rig equipment on the jack up rig that will be connected to the modular electrical system; selecting electrical equipment to control the rig equipment; placing the electrical equipment in an electrical module; and electrically connecting the electrical equipment to power cables and control cables inside of the electrical module; and testing the electrical equipment inside of the electrical module.

6 Claims, 31 Drawing Sheets

METHOD AND APPARATUS FOR A MODULAR JACK UP RIG ASSEMBLY

CROSS REFERENCE TO RELATED APPLICATIONS

This patent application claims priority from U.S. Provisional Patent Application Ser. No. 61/859,867 filed on Jul. 30, 2013 and entitled A Method and Apparatus for a Modular jack Up Rig Assembly, which is here incorporated by reference in its entirety.

BACKGROUND OF THE INVENTION

In the past jack up installations have been complex operations requiring the interconnections of hundreds of parts used to construct equipment to be positioned on an off shore jack up rig.

SUMMARY OF THE INVENTION

A modular electrical control system for a jack up rig, the system is disclosed, including but not limited to a module housing; a plurality of equipment sections connected together inside of the module housing; a control cable marshaling panel mounted on the module housing; a plurality of control cables connected between the control cable marshaling panel and the plurality of equipment section installed inside of the module housing; a power panel mounted on the module housing; a plurality of power cables connected between the power panel and the plurality of equipment sections inside of the module housing; a plurality of control cables connected between the control cable marshaling panel and the rig equipment, thereby providing control connectivity between the rig equipment and the plurality of equipment sections installed inside of the module housing; and a plurality of power cables connected between the power panel and the plurality of equipment sections inside of the module housing and the rig equipment, thereby providing power connectivity between the rig equipment and the plurality of equipment sections installed inside of the module housing.

DETAILED DESCRIPTION OF AN ILLUSTRATIVE EMBODIMENT

Figure 1:
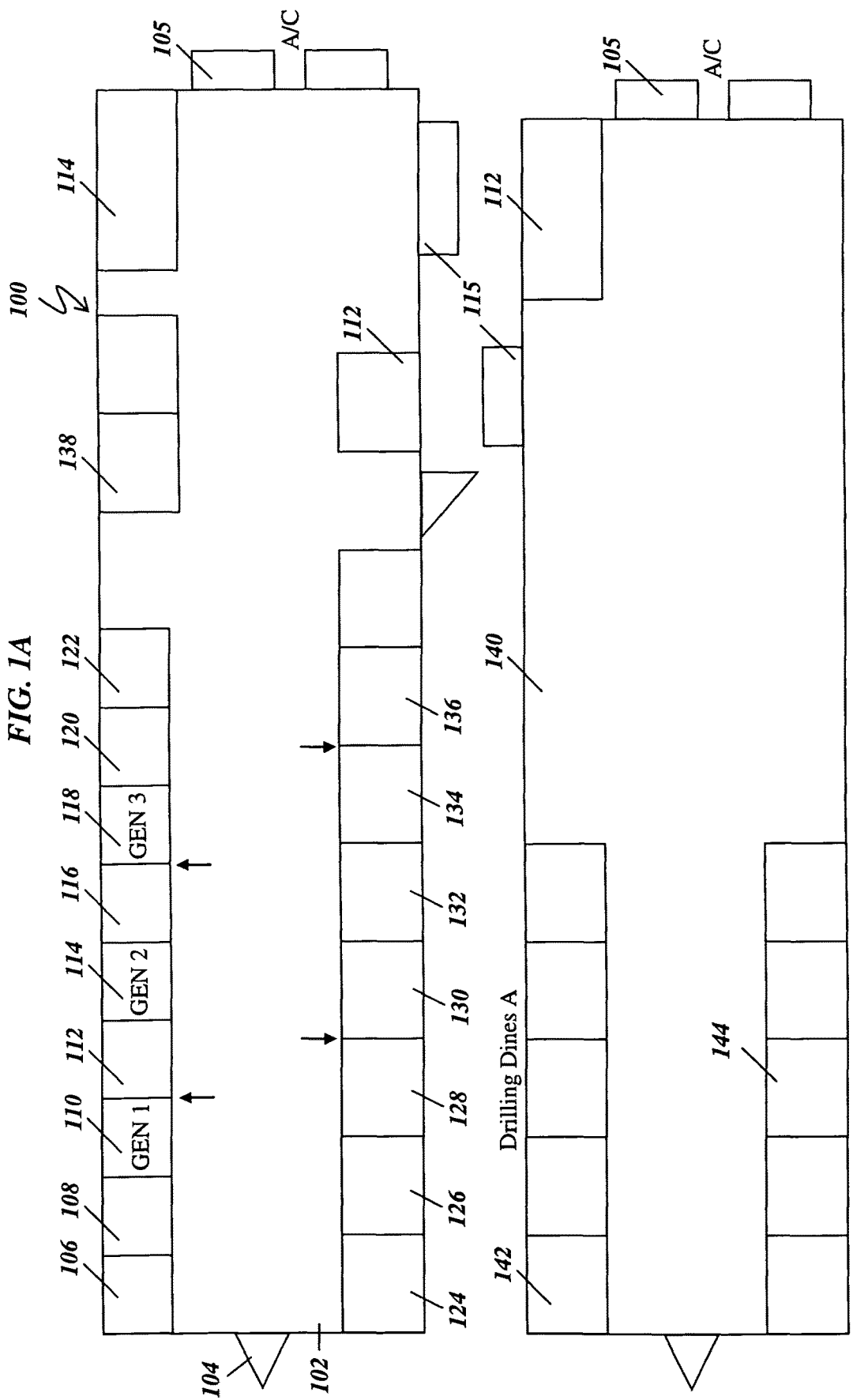
FIGS. 1A and 1B are plan view schematic depictions of an illustrative embodiment a power system is provided as a set of prefabricated and pretested electrical modules 100.

Portions of this specification and figures are subject to copyright protection. The applicant has no objection to patent office personnel making copies for us in official patent business but retains all rights in copyright in this patent application. In the past jack up installations have been complex operations requiring the interconnections of hundreds of parts used to construct equipment to be positioned on the platform of a jack up rig. The present invention preassembles components into modular sections into a modular jack up rig assembly so that there is an order of magnitude less complexity to assemble the jack up rig assembly once the jack up rig assembly arrives at a foreign destination. The modular jack up rig assembly comprises modules containing hundreds of parts and numerous sections of equipment bolted together and place in a housing, referred to herein as a "module", which can be tested and sealed and then certified during manufacture. The certified modules are then shipped to a foreign destination where the modules are connected together for a simplified assembly. The simplified modular approach helps to overcome the limitations of language barriers and available documentation during assembly at a foreign destination on a jack up rig. The equipment is usually installed in 2 to 3 modules.

In a particular illustrative embodiment, a module design computer is provided having a non-transitory computer readable medium having a module design computer program stored therein. The computer program provides instructions, that when executed by the module design computer perform the functions of design a module. In another particular embodiment the computer program is a neural network that learns from prior designs and performs to design a module based on design parameters input to the module design computer.

In a particular illustrative embodiment of the invention, a computer based system and method designs a module(s) and reduces efforts required to install the module(s) a modular electrical control system. In an illustrative embodiment, modules are designed on the module design computer and built to perform as an ECR, an Engineer Operator Station (EOS) and an Electronic Power Room (EPR). The modules are designed to according to a plurality of design parameters that are set to accommodate the requirements of and improve upon the environment in which they are placed. In a particular embodiment, the modules are designed for and place on an offshore jack up oil rig. In another particular embodiment, the modules are designed for and place on a ship.

When a module is prepared for a jack up rig, several design parameters are considered in laying out the equipment into modules for installation on the jack up rig. The shape of each module (ECR, EOS and EPR) are designed to conform to the physical space limitations on the jack up rig into which each of the modules is placed. Each module has a separate space, size and volume design parameter. In an illustrative embodiment a jack up rig a module design parameter includes but is not limited to a load bearing module roof. On a jack up right, the roof a module can also become a part of the rig floor and be required to have a load bearing weight room exceeding 50,000 pounds. A hole is cut or designed into the rig floor so that a module can be lifted by a crane and lowered into the hole in the rig floor. The hole in the rig floor is the shape of the module so that the module is placed in the hole and welded to the surround rig floor so that the roof of the module becomes part of the rig floor. On a ship, a module shape design parameter fits the module shape into the existing shape of the ship's hull where in the module becomes an integral part of the ship's hull.

In another illustrative embodiment of the invention, another design parameter is set for a module weight. A module on a jack rig floor is designed to be as light as possible while still meeting other design considerations. One module weight design parameter for a jack up rig module includes the lifting capacity of the cranes on the jack up rig. One module weight design parameter for a jack up rig module includes a current and maximum weight for the jack up rig to keep the jack up rig module(s) light enough so that the added weight of the module(s) does not make the total weight of the jack up rig so heavy that one of the 3 or 4 legs of the jack up rig punches through the ocean floor and upsets the balance of the jack up rig resting on 3 or floor jack up rig legs. The module weight design parameter ensures that a crane capacity on the jack up rig is sufficient to lift the module off a delivery barge and place it into position on the jack up rig. Modules that are not part of the rig floor on a multiple floor jack up rig do not require a heavy load bearing roof. Additional design parameters for a module include but are not limited to module height, weight, shape, width; existing equipment to which the module must connect and or control; minimizing electrical cable connection runs length and electrical interference between equipment pieces inside of a module; minimizing electrical cable connection runs length and electrical interference between modules; minimizing electrical cable connection runs length and electrical interference between a module and existing equipment on the rig; fitting the module shape, size, volume and foot print into an existing jack up rig; fitting the module shape, size, volume and foot print into an existing jack up rig design; putting control functions in a module near a function to which the module connects and controls; connection path lengths between equipment inside of a module; temperature considerations for equipment inside and outside of a module; ventilation of equipment inside and outside of a module; electrical interference between equipment inside of a module; electrical interference between equipment inside of a module and equipment outside of a module; accessibility to equipment for equipment install, repair and control inside of a module; and accessibility to equipment for equipment install, repair and control outside of a module.

When a modular electrical control system, the following tasks have to be performed on an active oil rig or ship, effectively taking the oil rig or ship out of operation until the installation of the electrical control system is installed tested and commissioned, which can take 4-6 weeks and cost $50-100 million dollars in lost rig time or ship time and huge monetary penalties that have to be for vendor delays and rig or ship overhear during the installation down time.

In a particular embodiment, a particular module, an integrated engine control room (ECR) module is furnished as a deliverable. If the ECR module is not furnished as a deliverable, the following list is to help understand what extra work is involved in stalling the equipment that would otherwise have been delivered in tested and working order inside the module.

In a particular embodiment of the present invention, a method is disclosed for building a modular electrical system for a jack up rig, the method including but not limited to identifying rig equipment on the jack up rig that will be connected to the modular electrical system; selecting electrical equipment to control the rig equipment; placing the electrical equipment in an electrical module; electrically connecting the electrical equipment to power cables and control cables inside of the electrical module; and testing the electrical equipment inside of the electrical module. In another particular illustrative embodiment of the present invention the method further includes but is not limited to locking the electrical module and shipping the module to a jack up rig; and connecting rig equipment to the outside of the locked electrical module. In another particular illustrative embodiment of the present invention the method further includes but is not limited connecting the control cables for the electrical control equipment to a control cable marshaling panel inside of the electrical module; connecting the power cables for the electrical control equipment to a power panel inside of the electrical module; connecting control cables connected to control test equipment simulating the rig equipment to the control cable marshaling panel thereby providing control connectivity between the electrical equipment inside of the electrical module and the test equipment; and connecting power cables connected to the power test equipment simulating rig equipment to the power panel thereby providing power connectivity between the electrical equipment inside of the power test rig equipment; and certifying that the test module is working properly before shipping the electrical module for installation.

In another particular illustrative embodiment of the present invention the method further includes but is not limited connecting the control cables for the electrical control equipment to a control cable marshaling panel inside of the electrical module; connecting the power cables for the electrical control equipment to a power panel inside of the electrical module; connecting control cables connected to the rig equipment to the control cable marshaling panel thereby providing control connectivity between the electrical equipment inside of the electrical module and the rig equipment; and connecting power cables connected to the rig equipment to the power panel thereby providing power connectivity between the electrical equipment inside of the rig equipment.

In another particular illustrative embodiment of the present invention a modular electrical control system for a jack up rig is disclosed, the system including, but not limited to a module housing; a plurality of equipment sections connected together inside of the module housing; a control cable marshaling panel mounted on the module housing; a plurality of control cables connected between the control cable marshaling panel and the plurality of equipment section installed inside of the module housing; a power panel mounted on the module housing; a plurality of power cables connected between the power panel and the plurality of equipment sections inside of the module housing; a plurality of control cables connected between the control cable marshaling panel and the rig equipment, thereby providing control connectivity between the rig equipment and the plurality of equipment sections installed inside of the module housing; and a plurality of power cables connected between the power panel and the plurality of equipment sections inside of the module housing and the rig equipment, thereby providing power connectivity between the rig equipment and the plurality of equipment sections installed inside of the module housing.

In another particular illustrative embodiment of the present invention a computer based system for designing an electric module is disclosed, the system including, but not limited to, the system a processor in data communication with a non-transitory computer readable medium; a computer program stored in the computer readable medium, the computer program comprising instructions that when executed by the processor perform function that design the electric module, the computer program comprising: instructions to input design parameters to a module design computer, the design parameters including but not limited to a shape parameter indicating dimensions into which each of the modules is placed; and instructions to output from the module design computer a module design having a shape in accordance with the shape parameter dimension wherein the module shape conforms to the structural environment into which the module is placed.

In another particular embodiment of the computer based system for designing an electric module the design parameters further include but are not limited to physical space, size and volume limits and wherein the module design has a physical space, size and volume in accordance with the physical space, size and volume limits. In another embodiment of the computer based system for designing an electric module the shape design parameter include but are not limited to a ship hull shape, wherein the computer program fits the module shape into the existing shape of the ship's hull where in the module becomes an integral part of the ship's hull and outputs the module shape to a design computer output device. In another particular embodiment the computer program further includes but is not limited to instructions to input a load bearing module roof design parameter; and instructions to output from the module design computer a propose module design having a load bearing capacity in accordance with the load bearing module roof design parameter. In another particular embodiment the computer based system, the computer program further includes but is not limited to instructions to input a module design parameter for a module weight; and instructions to output from the module design computer a propose module design having a weight in accordance the module weight design parameter.

In another particular embodiment the computer program further includes but is not limited to instructions to input to the module design computer a lifting capacity design parameter of a crane on the jack up rig; and instructions to output from the module design computer a module design having a weight that is less that the lifting capacity design parameter. In another particular embodiment the computer program further includes but is not limited to instructions to input a module weight design parameter for a jack up rig module comprising a current jack up rig weight and a maximum jack up rig weight for to keep the jack up rig module light enough so that the added weight of the module does not exceed the maximum jack up rig weight; and instructions to output from the module design computer a module design having a weight that is less than the maximum jack up rig weight.

In another particular embodiment the computer program the design parameters further comprise an identification of existing equipment in side module, the method further includes but not limited to instructions to output a module design minimizing electrical cable connection run lengths between equipment inside of the module and electrical interference between equipment inside of the module, minimizing electrical cable connection runs length and electrical interference between equipment in the module. In another particular embodiment the computer program further includes but is not limited to instructions to input to the module design computer a list of equipment outside of the module to which the module connects; and instructions to output from the module design computer a module design having cable connection paths substantially minimizing cable lengths between equipment inside and outside of the module, minimizing electrical cable connection runs length and electrical interference between a module and existing equipment outside of the module. In another particular embodiment the computer program further includes but is not limited to instructions to input to the module design computer a temperature design parameter for equipment inside and outside of a module; instructions to output to the module design computer a module design addressing the temperature design parameter of equipment inside and outside of a module; outputting to the module design computer a layout that substantially minimizes electrical interference between equipment inside of a module and electrical interference between equipment inside of a module and equipment outside of a module; and instructions to output from the module design computer a module design that addresses accessibility to equipment for equipment install, repair and control inside of the module and accessibility to equipment in the module for equipment install, repair and control of the equipment in side of the module.

In an illustrative embodiment of the invention, the electrical module is an integrated ECR electrical module design. The ECR module lowers the cost and reduces risk for shipyards. The ECR module allows to pretesting systems and deliver them as fitted on the vessel inside the ECR. There is no shipyard involvement inside the ECR, so there is no chance for accidental damage to the equipment. The equipment is protected by the steel ECR. The switchboards do not have to be re-tested once on site in the shipyard because they are never disassembled for shipment; therefore the original tests are still valid.

The time it takes the shipyard to connect power and control cables to the supplied ECR module is greatly reduced when compared to connecting another system that requires heavy shipyard involvement for the success of the project. In an illustrative embodiment of the present invention, the system and method supplies specifically centrally located easy access marshalling panels for all shipyard connections. This speeds up the time it takes for the shipyard to make the control connections.

Commissioning time is especially important on these types of vessels due to the number of vendors required on aboard during this time. Problems with any one vendor or system greatly increases cost overruns due to standby time that would be incurred by the shipyard from all vendors that wait while the problems are resolved. The pre-tested ECR module insures that no one is waiting for electrical power to perform dockside testing or sea trials. Without electrical power, no other vendors can test or commission their systems. The electrical system is the heartbeat of the vessel. The ECR electrical module greatly reduces the responsibility of the shipyard, as well as, reducing the learning curve that would be required on conventional systems provided by our competitors.

The electrical module of the present invention greatly reduced the unknowns which arise during these types of diesel/electric projects. This in turn saves the shipyard time and money and allows the operator to get the vessel on day rate sooner.

Turning now to FIG. 1, in an illustrative embodiment of the present invention, a pretested electrical modules 100 are configured and pretested for installation on a jack up rig. As shown in FIG. 1, a house or module housing (hereinafter referred to as a module, module housing or electrical module) is provided. A plan view of a first module 102 is shown with a door 104 and interior chamber containing electrical equipment. The housing itself is a steel rectangular housing total self-contained with air conditioners 105. The present invention serves to provide modular control systems for offshore jack up rigs that have to generate their own electrical power. The present invention provides modules for providing a power system to generate, manage, transforming and distributing the power and rig equipment on the off shore jack up rig. In a particular embodiment an engineering control modules (ECM), an engineer operator station (EOS) and an electrical power module (ECM) are provided as modules, also referred to herein as electrical modules.

In an illustrative embodiment, a first module 102 is provided containing a switch board 106, circuit breakers 108 and generator controls 110 and other related electronics related to the tasks to generate, manage, transform and distribute the power on the off shore jack up rig. Several generators are provided for various voltages which may include but is not limited to a 690 V generator switch board, a 230 V generator switch board and a 480 V switchboard. The module also may include but is not limited to a desk 112 and control cabinet 114 for containing an automation system which includes a processor and a non-transitory computer readable medium. A control cable marshalling panel 115 is provided containing cabling connections. Control cables that are connected to the electrical equipment inside of the electrical module are connected to the control cable marshaling panel. Control cables that run to the rig equipment or to another module are connected to the outside of the module to an exterior side of the control cable marshaling panel is covered by a removable door for protection during shipment and foreign objects on the rig until installation personnel are ready to connect the module to the rig equipment or another module. The control cable which tie in from the jack up rig to the equipment inside of the module 102.

Substantially all equipment inside of the module 102 that need a connection with the jack up rig external to the module 102 tied to electrical connectors at the control cable marshalling panel from connection to wiring to equipment on the jack up rig external to the module 102. All equipment inside of the module 102 is wired to the control cable marshalling panel so that when the module is delivered to a destination ship yard, the shipyard personnel do not have to enter the module to connect to the equipment inside of the module. The shipyard personnel need only remove the cover to access the external portion of the control cable marshalling panel. This cuts down installation time and expense for installing the equipment inside of the module to the jack up rig. In the past substantially all the equipment inside of the module was delivered for wiring and assembly at the ship yard. Many of the pieces of equipment were typically destroyed during the process causing reorder and reinstall on much of the equipment. In an illustrative embodiment, the module is prefabricated and pretested at the factory and delivered in a sealed container which accessed electrically from outside via the marshalling panel without the need to enter the module. The ship yard can electrically access the electrical equipment inside of the module using the electrical connections thereto via the marshalling panel 115. The equipment inside the module is assembled and tested at the factory and sealed inside the module for easy installation without requiring access to the inside of the module 102. All the cables are already run between the equipment inside of the module. The power to the generators 110, 114 and 118 is provided through a power panel 111 which is an electrical connector which is covered and protected until it is connected to electrical power cables for the rig equipment from the outside and does not require entry into the module at the jack up right to connect power cables to the generators 110, 114 and 118. Thereby limiting the ship yard personnel access to exposure to only the outside connectors and the ship yard personnel does not have to come inside of the module to connect to the sensitive electronics inside. In an illustrative embodiment, the first module 102 contains switch gear. A second module 140 is provided containing drilling drives that may include but is not limited to a first set of drilling motor drives 142 and a second set of drilling motor drives 144. In another embodiment a third module is provided containing additional equipment.

Figure 2:
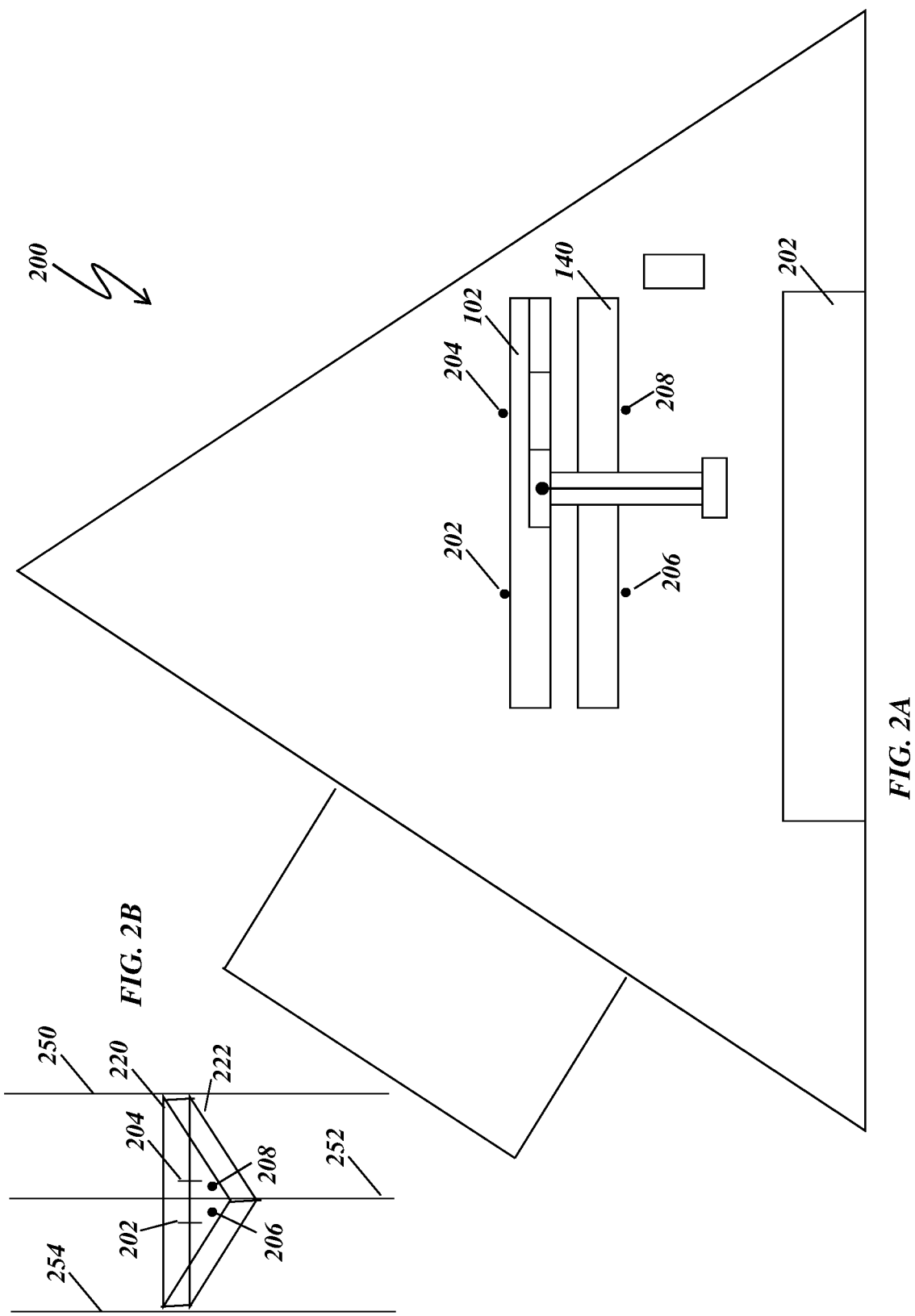
FIGS. 2A and 2B are plan view illustrations an illustrative embodiment of the present invention comprised of 3 modules interconnected on a jack up rig.

Turning now to FIG. 2, an illustrative embodiment is depicted showing three modules 102, 140 and 202 located on a jack up rig platform 200. A first module 102, a second module 140 and a third module 202 are positioned between support beams 203, 204, 206 and 208. Support beams 203, 204, 206 and 208 run between a first floor 222 and a second floor 220 comprising the jack up rig platform. The jack up right platform is supported by three geared vertical supports 250, 252 and 254. The geared supports are also referred to herein as legs. In one particular embodiment, the electronics are grouped for functional proximity and proximity to exterior devices such as a mud pump, which the electronics inside of the module control. For example, a mud pump controller will be located in a module proximate the mud pump. Each installation is different and the grouping the electronics in 1, 2, 3 or more modules.

In the past, all the electronics inside of the modules were delivered to the shipyard in separate switch board assemblies. Each switch board assembly was delivered separately to the ship yard. It was up to the ship yard personnel to connect these electronics together and test them. The ship yard personnel would then build a metal box containing the electronics. Each switch board comprised many cabinets and the switchboard would have to be broken up into separate shipping splits. Thus a switch board would be delivered in 3 separate pieces instead of a single unit contained inside of a module. The three separate subassemblies were wired up separately and the buss structure for each sub assembly was designed to be disconnected between separate switch board assemblies for shipping. The switch board assemblies were wired together and the busses connected together between the switch board assemblies for testing. After testing the switch board assembly wiring and buss connections were removed for shipping. The ship yard would receive the switch board assemblies and put them in a ware house for several months until they were ready to install them on a drilling rig such as an off shore jack up rig. The ship would then build a metal room and drop in each of the shipping splits separately and hope not to damage anything in the process of dropping the switch board assembly into the metal room with a crane in sometimes adverse weather conditions. The ship yard personnel would then wire the switch board assemblies together and run wires to connect them to external equipment on the rig. The shipyard personnel then weld a roof on the metal room they had built. Each of the walls of the metal had to be welded along with a roof/upper deck. During the construction of the walls a lot of grinding dust and filings are generated that can foul or damage the electronics and switch board assemblies.

The interior of the metal rooms has to be painted also. Thus, the electronics inside of the housing are exposed to damage during crane transit, metal filings and dust from welding and grinding during construction and damage from paint over spray. In addition, shipyard personnel stand on the equipment and equipment door handles during construction and painting of metal room, thereby further damaging the switch board assemblies. Thus, a brand new installation could look 30 years old right after construction due to the abuse it had to withstand during construction of the metal housing by the shipyard personnel on the jack up rig. The metal housing is made of steel that has to be cut, ground smooth and welded together in the presence of the sensitive electronics that do inside of the metal housings. Thus metallic shaving end up inside of the electronics and failure due to short circuits commonly occurs upon initial power up. Thus, it requires more spare parts to fix the shorted electronics. There is also time lost by having to reenter the metal housing to figure out what electronics have failed and replace them. In addition, there is a lack of quality control from the originating company that manufactures the equipment based on the lack of communication and understanding between the manufacturer and the ship yard. There can also be problems due language barriers and a lack of appropriate documentation to enable the shipyard personnel to properly connect and construct the electronics inside of the metal room. It costs a lot more and is substantially more difficult to install the electronics on the jack up rig using the old method of building the metal room on the jack up rig and installing the electronics there in. There can also be delays in ordering spare parts and procedural delays over who is responsible for such failures and who should replace the damaged parts.

In an illustrative embodiment, the preassembled electrical modules, are constructed and painted before any equipment goes in. Large pieces of switch gear are brought into the module through a large entry door to the module via a fork lift door eliminating the crane and eliminating exposure of the electronics inside of the module to metal filings, metal dust and paint. Additionally the equipment is not used as a stepping and standing stool during the building and painting of the module. Also, since the electrical module is delivered as a sealed unit, it is easy to determine who is responsible if the electrical module fails, since there were not shipyard personnel inside the electrical module, the manufacturer of the module is responsible for problems that occur inside of the electrical module. The module manufacture knows based on their testing at the manufacturing site, that if the external connections to the electrical module are properly made, everything is going to work properly. Thus, commissioning of the modules is an order of magnitude less complex and cheaper than the old method of delivering separate pieces on the jack up rig. Thus, the present invention saves a lot of time and money. In one embodiment, a module is 24 feet wide by 57 feet long and 10 feet high. The modules will be installed along with other equipment and facilities such as a drill floor for the drilling derrick and the drilling drives inside one of the modules would be cabled to the drilling derrick.

In a particular embodiment of the invention, electrical equipment is contained in electrical equipment modules, referred to herein as modules that are pretested and preassembled and are ready for installation on a ship or jack up rig with minimal set up time. In a particular embodiment of the present invention a modular ECR can be cut out of a jack up rig deck and placed elsewhere on the jack up rig floor using an existing crane on the jack up rig. A replacement modular ECR is then dropped into place by the existing crane.

Figure 3:
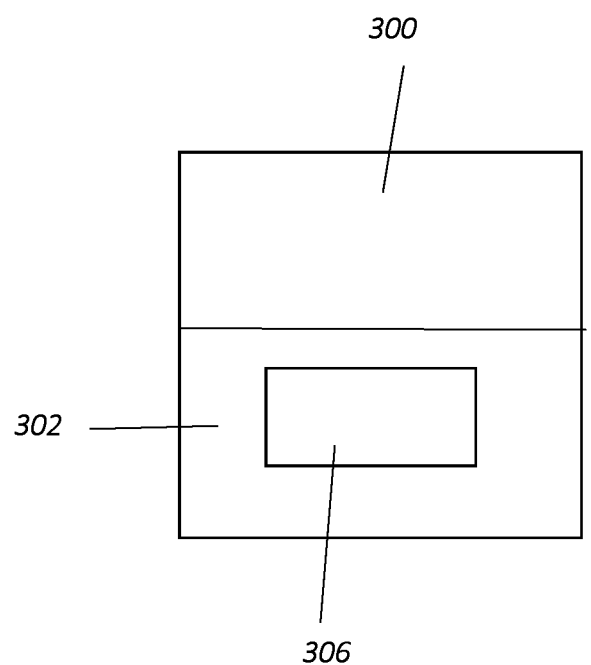
FIG. 3 depicts a plan view of a module design computer in data communication with a non-transitory computer readable medium.

FIG. 3 depicts a module design computer 300 in data communication with a non-transitory computer readable medium 302. The term "data communication" is used in this patent application to mean data is exchanged between two devices that are in "data communication". A computer program is stored in the non-transitory computer readable medium. A presentation display 304 in data communication with the processor is also provided for presenting module designs to an operator. A computer program 306 is embedded in the non-transitory computer readable medium.

Figure 4:
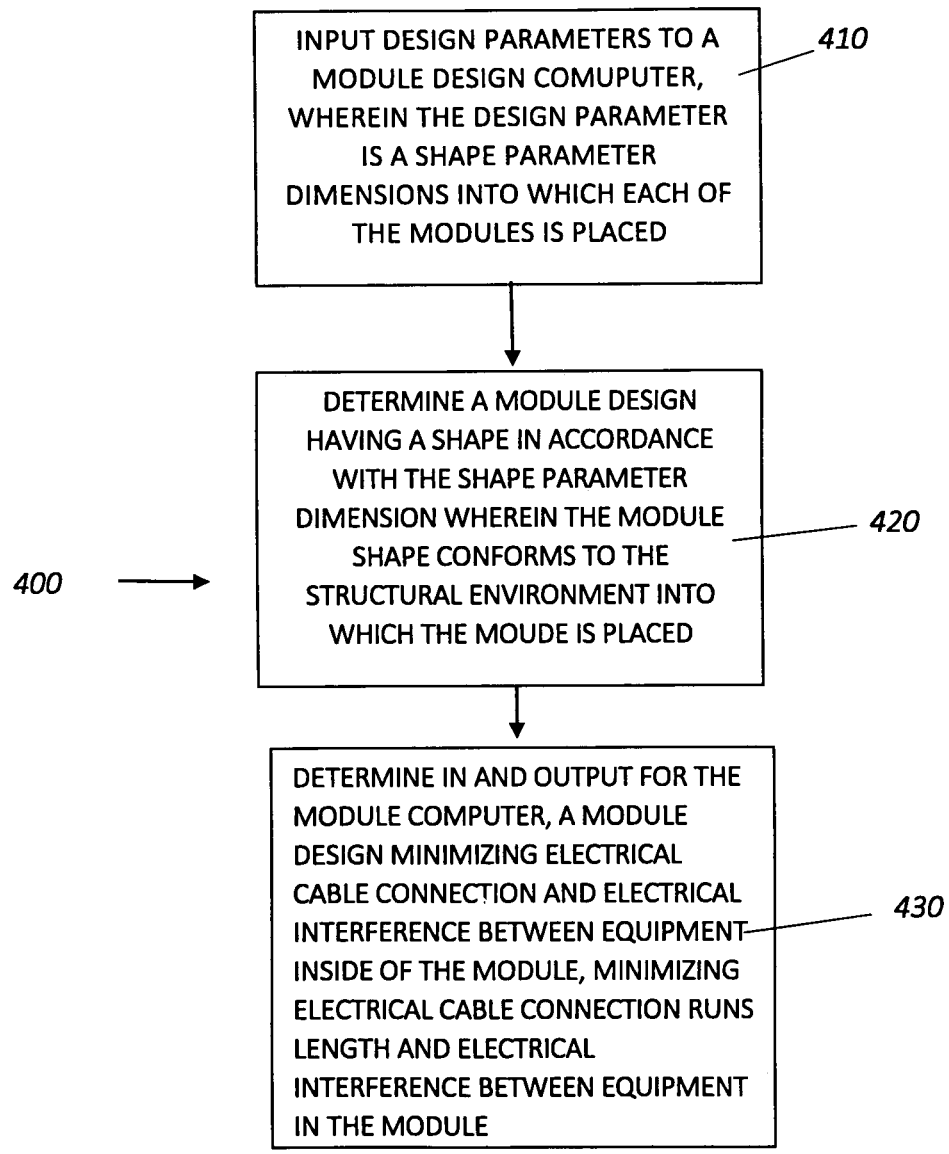
FIG. 4 depicts a flow chart for a portion of a computer program that runs on the module design computer.

FIG. 4 depicts a flow chart for a portion of a computer program that runs on the module design computer. As shown in FIG. 4 the computer program executes instructions. The computer program 410 executes instructions to input design parameters to a module design computer, wherein the design parameter is a shape parameter dimensions into which each of the modules is placed. At 420 the computer program executes instructions determine in and output from the module design computer a module design having a shape in accordance with the shape parameter dimension wherein the module shape conforms to the structural environment into which the module is placed. At 430 the computer program determines in and output for the module computer a module design minimizing electrical cable connection run lengths between equipment inside of the module and electrical interference between equipment inside of the module, minimizing electrical cable connection runs length and electrical interference between equipment in the module.

Figure 5:
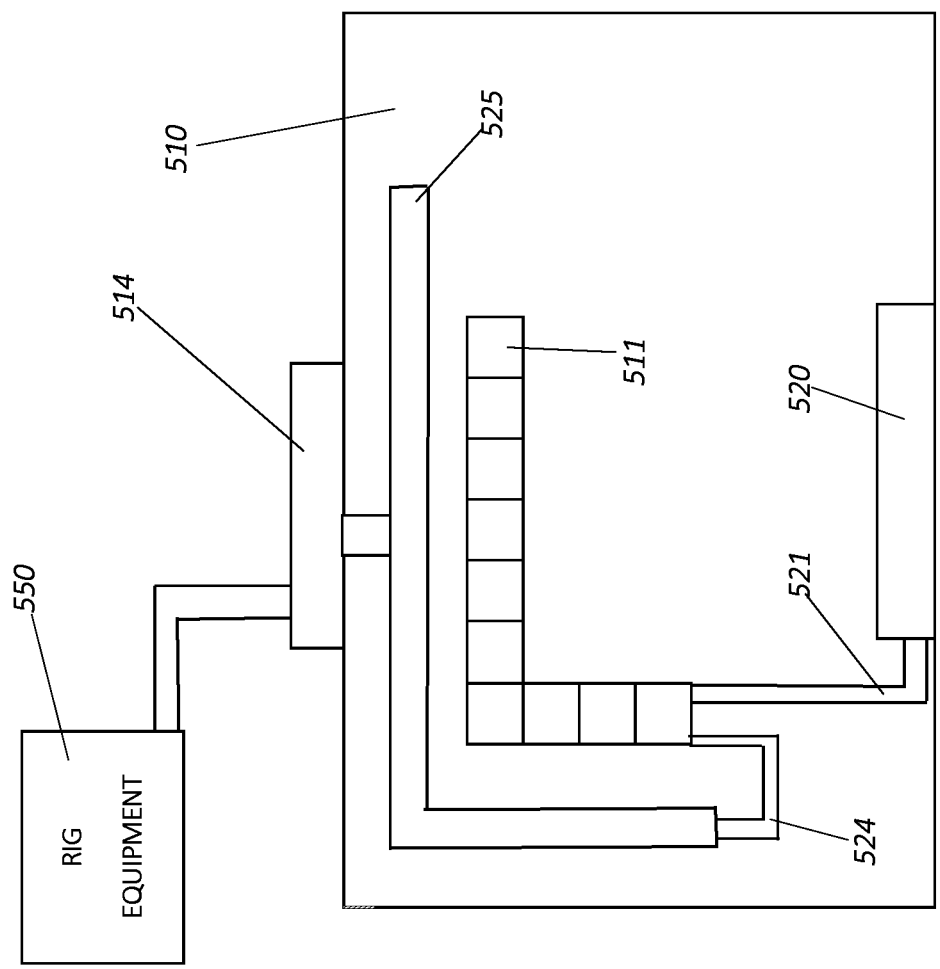
FIG. 5 depicts a plan view of a system 500 provided in a particular embodiment of the present invention.

FIG. 5 depicts a system 500 provided in a particular embodiment of the present invention. A module housing 510 a plurality of equipment sections 511 connected together inside of the module housing are shown. A control cable marshaling panel mounted on the module housing; a plurality of control cables 524 are connected between the control cable marshaling panel 514 and the plurality of equipment section installed inside of the module housing. The control cables are held in a control cable tray 525. A tray for holding the control cables is shown in the FIGS below. A power panel 520 is mounted on the module housing and a plurality of power cables 521 connected between the power panel and the plurality of equipment sections inside of the module housing. The power cables are held in a control cable tray 525. A plurality of control cables connected between the control cable marshaling panel and the rig equipment 550, thereby providing control connectivity between the rig equipment 550 and the plurality of equipment sections 111 installed inside of the module housing 510. A plurality of power cables connected between the power panel and the plurality of equipment sections inside of the module housing and the rig equipment, thereby providing power connectivity between the rig equipment and the plurality of equipment sections installed inside of the module housing.

Figure 6:
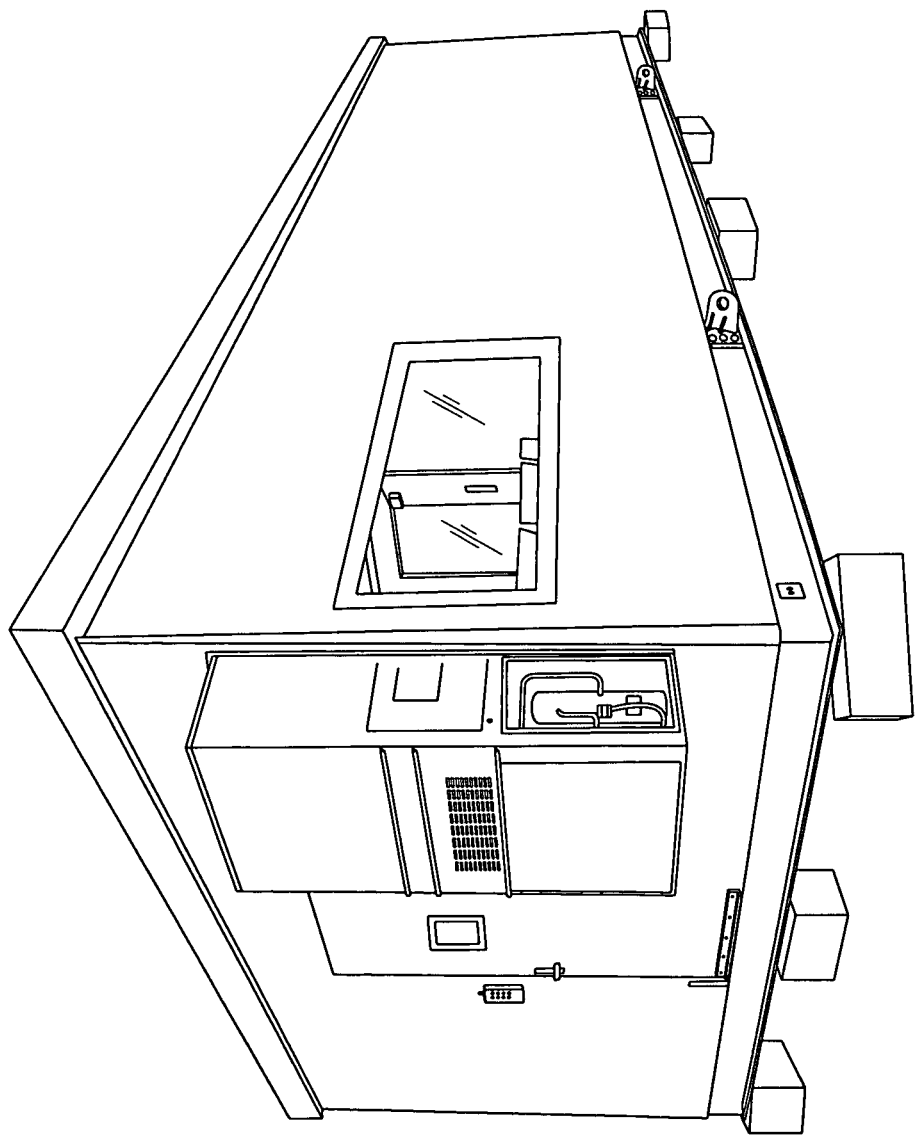
FIG. 6 depicts a side view of an illustrative embodiment of the invention with interlocking panel design with separate internal control and power rooms. Wall mounted A/C and field viewing window.

FIG. 6 depicts an illustrative embodiment of the invention including but not limited to a module housing with interlocking panel design with separate internal control and power rooms. Wall mounted A/C and field viewing window.

Figure 7:
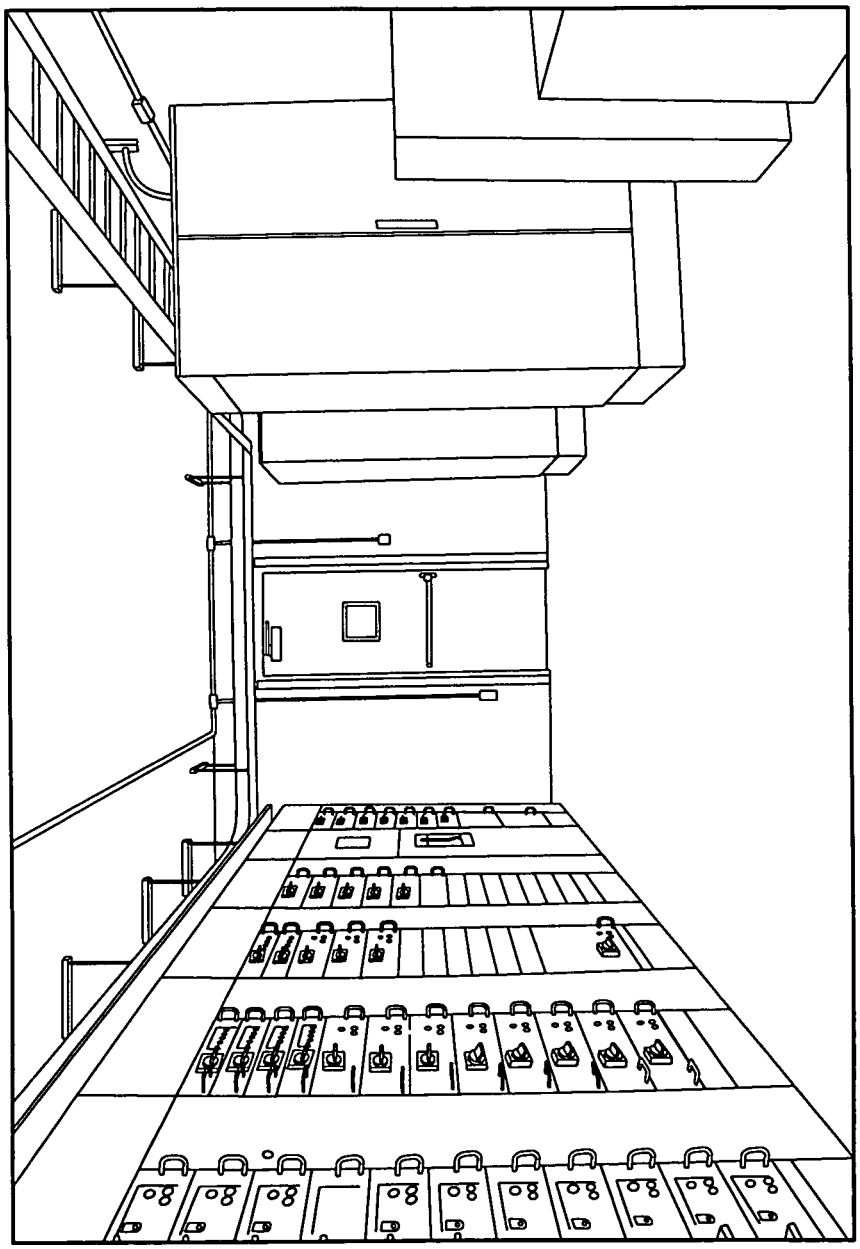
FIG. 7 depicts an internal view of an illustrative embodiment of the invention with internal of power section with integrated Motor Control Centers (MCCs) and Automation I/O Cabinets.

FIG. 7 depicts an illustrative embodiment of the invention including but not limited to a module housing with internal of power section with integrated Motor Control Centers (MCCs) and Automation I/O Cabinets.

Figure 8:
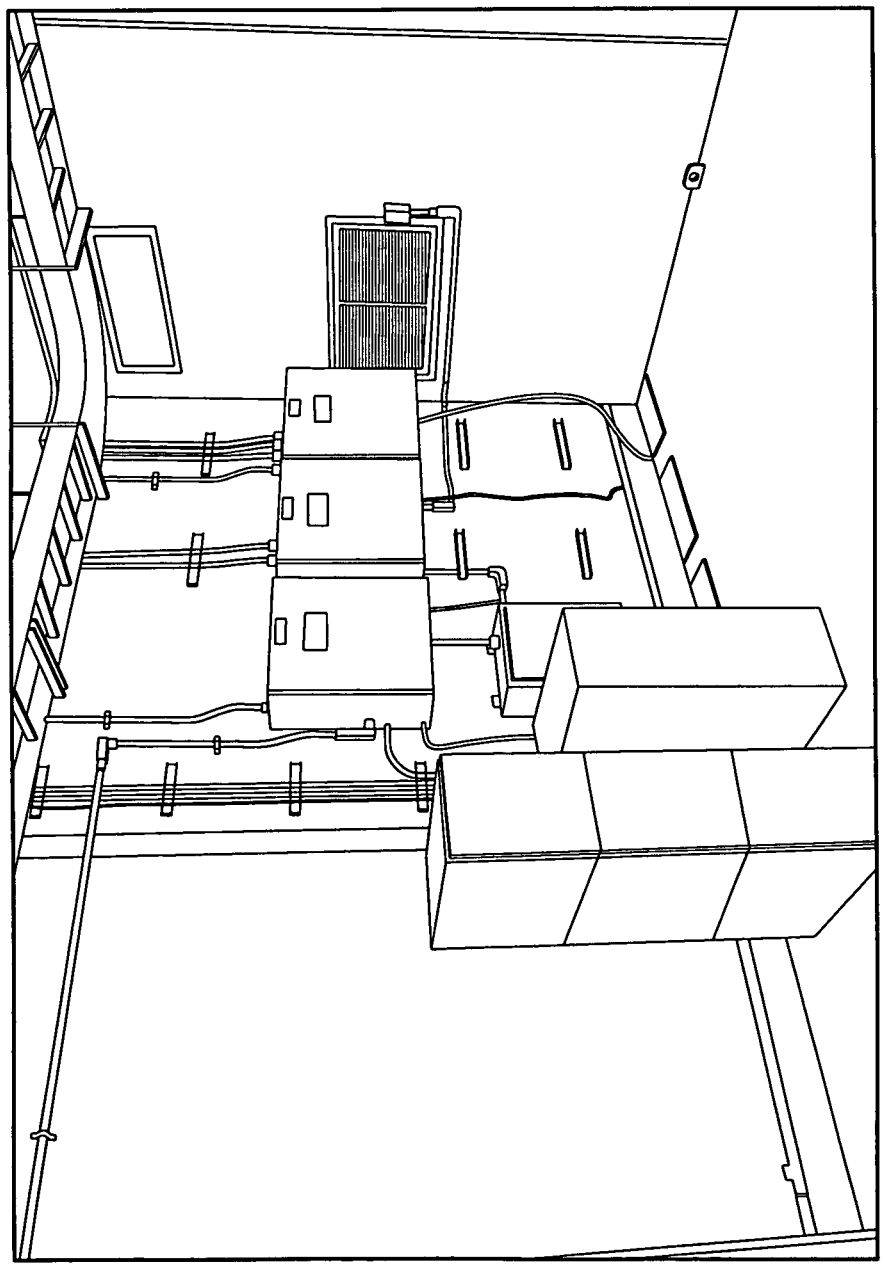
FIG. 8 depicts a front view of an illustrative embodiment of the invention with internal of power section showing 230 volt distribution panels and UPS mounted and interconnected.

FIG. 8 depicts an illustrative embodiment of the invention as a module housing with internal of power section showing 230 volt distribution panels and UPS mounted and interconnected.

Figure 9:
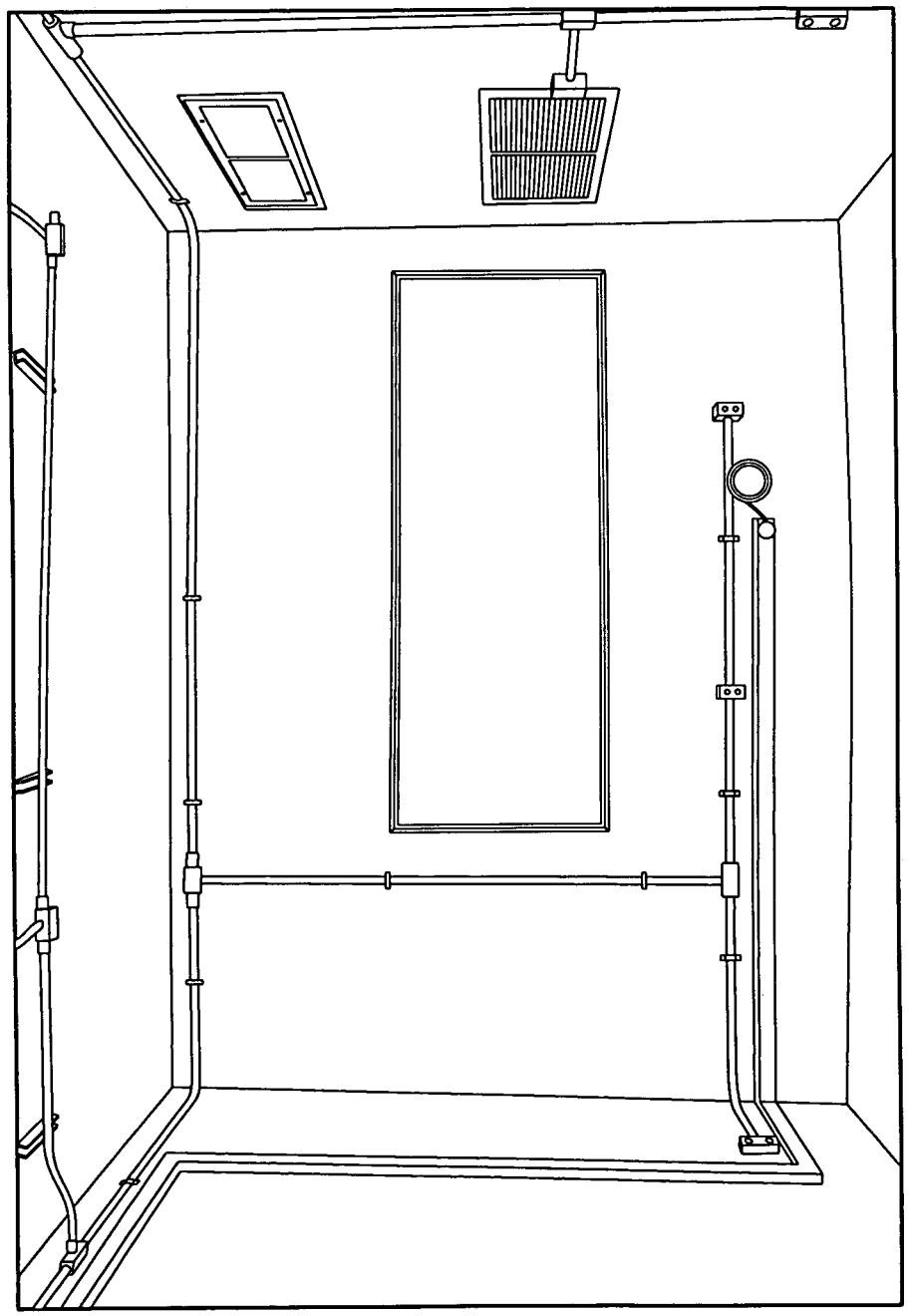
FIG. 9 depicts an internal view of an illustrative embodiment of the invention internal of control section with field viewing window, place for customer supplied desk and automation screens for control of the complete plant.

FIG. 9 depicts an illustrative embodiment of the invention internal of control section with module housing with a field viewing window, place for customer supplied desk and automation screens for control of the complete plant.

Figure 10:
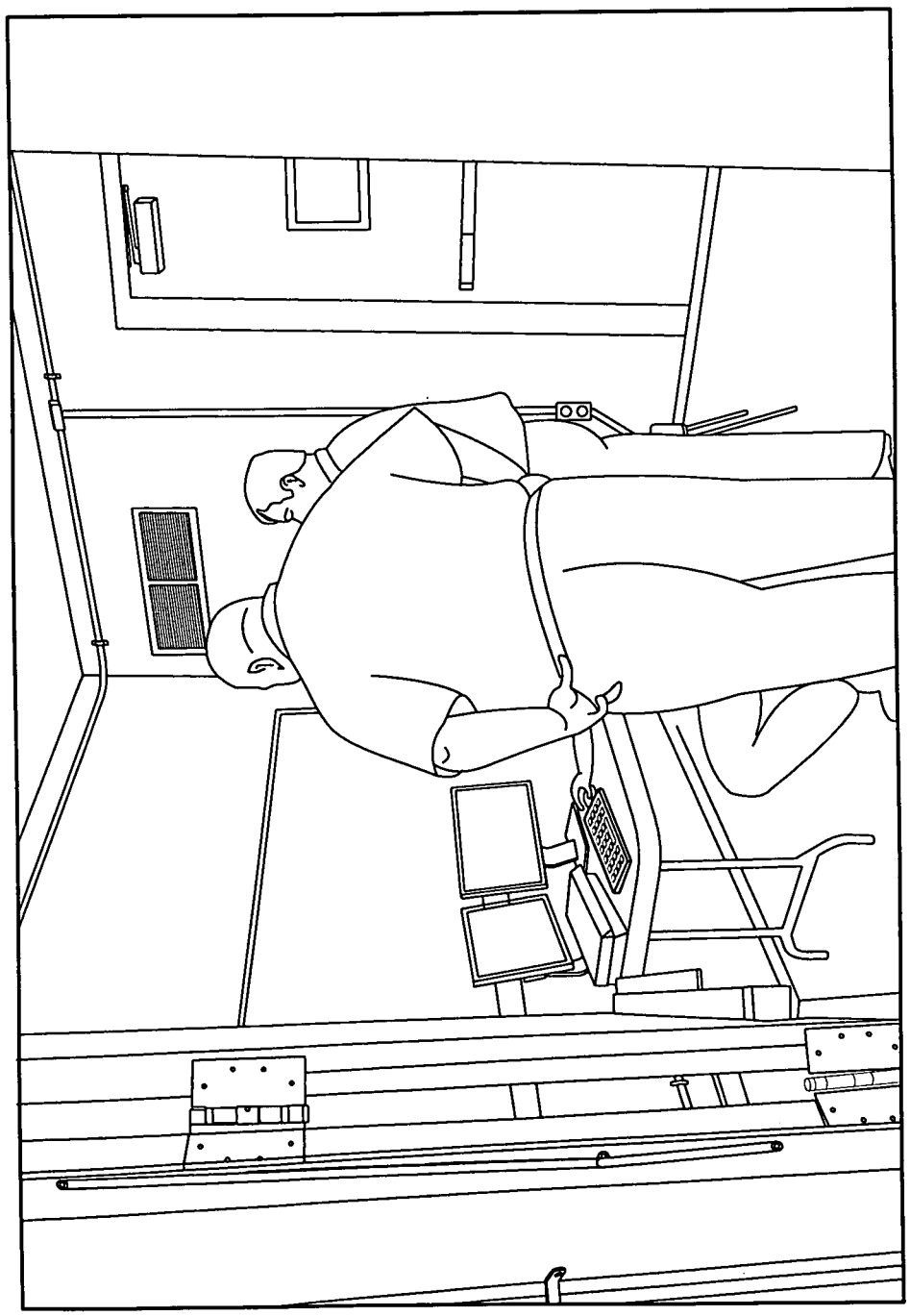
FIG. 10 depicts an internal view of an illustrative embodiment of the invention internal of control section during customer integrated test at EPD factory. Once complete automation screens are packed up for shipment.

FIG. 10 depicts an illustrative embodiment of the invention internal of control section of a module housing during customer integrated test at factory. Once complete automation screens are packed up for shipment.

Figure 11:
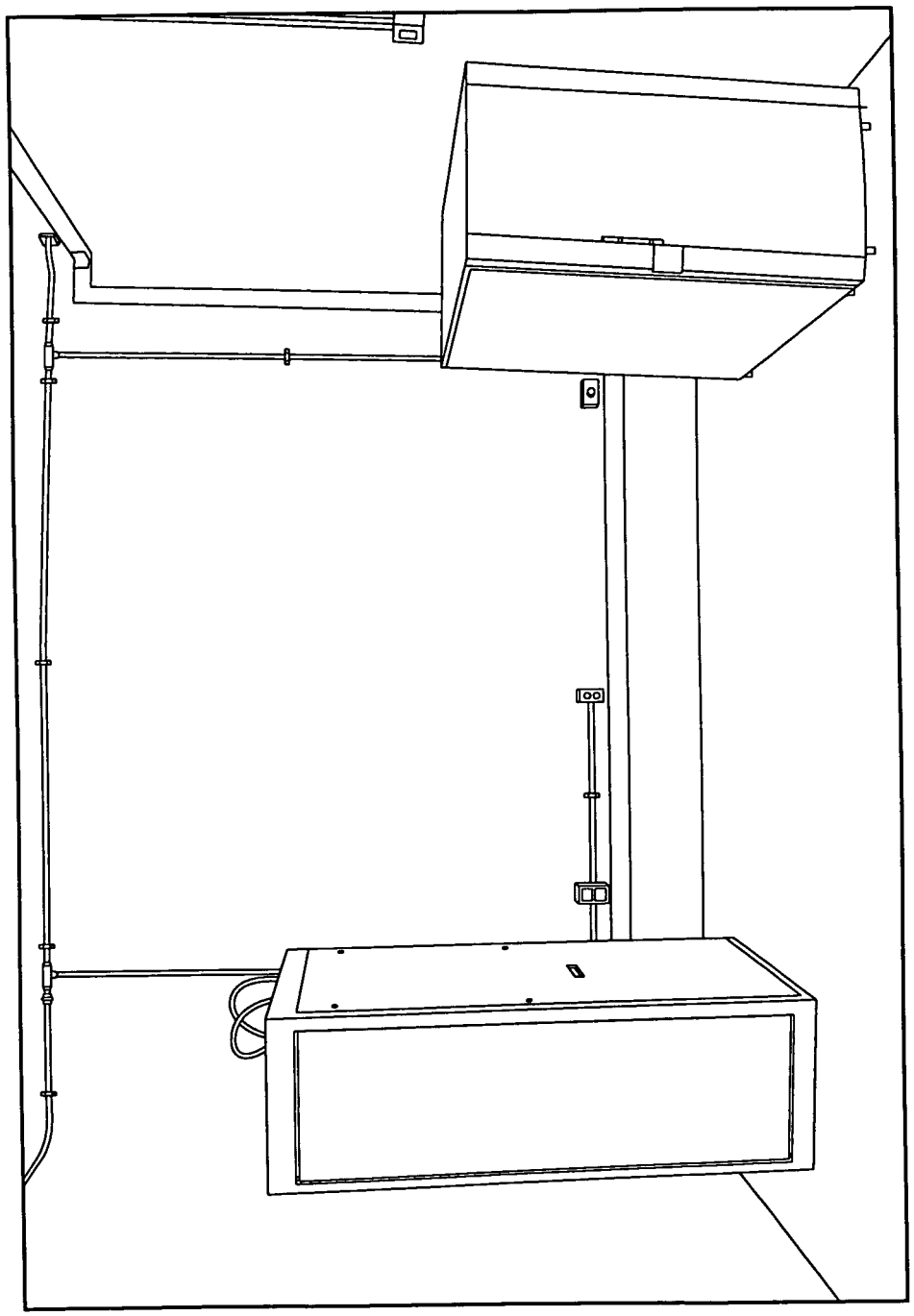
FIG. 11 depicts a front view of an illustrative embodiment of the invention wherein a view in control room behind automation desk with computer main frame and UPS mounted and interconnected.

FIG. 11 depicts an illustrative embodiment of the invention wherein a view in control room behind automation desk with computer main frame and UPS mounted and interconnected inside of a module housing.

Figure 12:
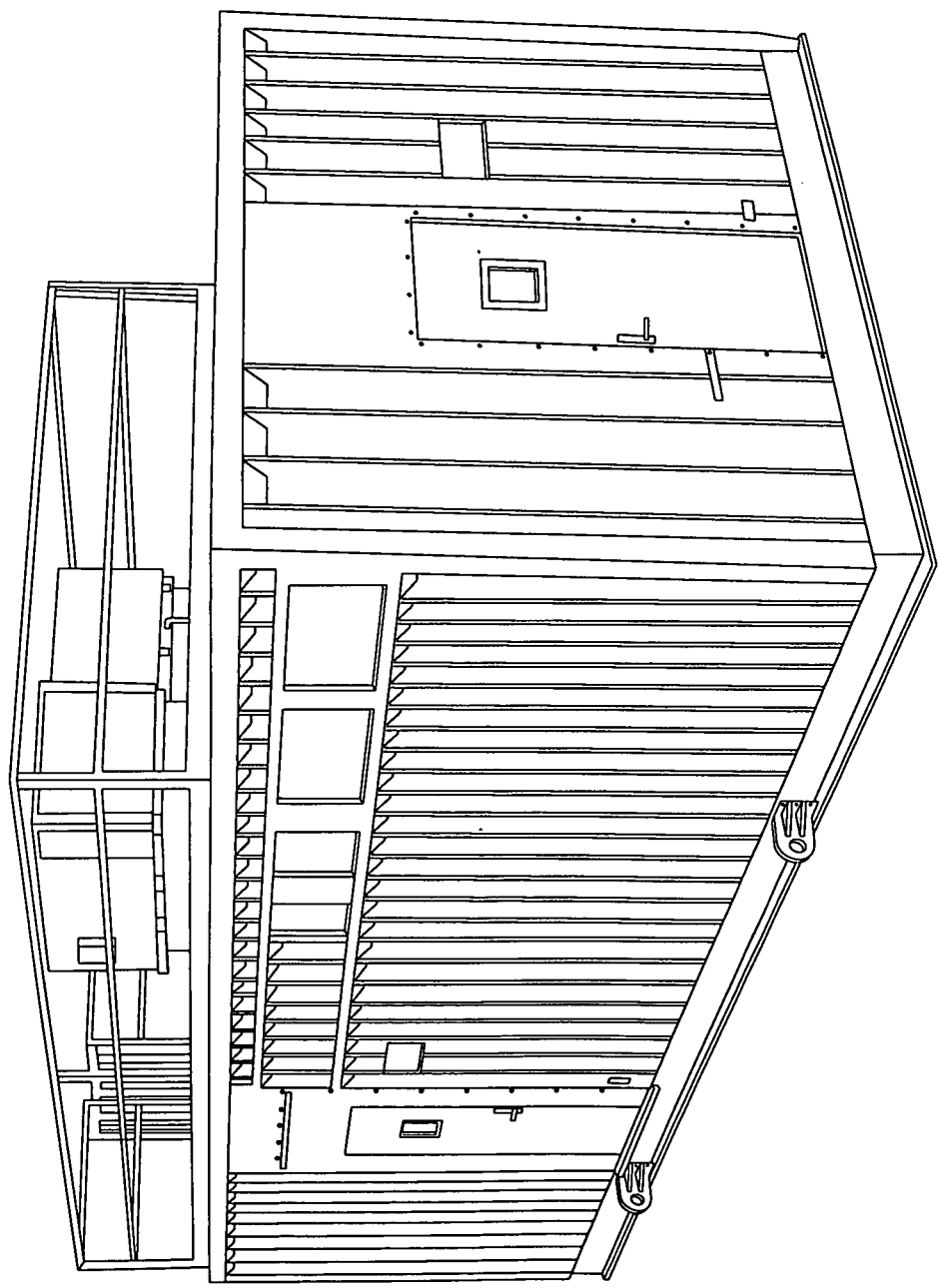
FIG. 12 depicts a front view of an illustrative embodiment of the invention having a corrugated seam welded design power module with redundant roof mounted A/C and side incoming/outgoing cable connection stainless steel gland plates.

FIG. 12 depicts an illustrative embodiment of the invention having a module housing with a corrugated seam welded design power module with redundant roof mounted A/C and side incoming/outgoing cable connection stainless steel gland plates.

Figure 13A:
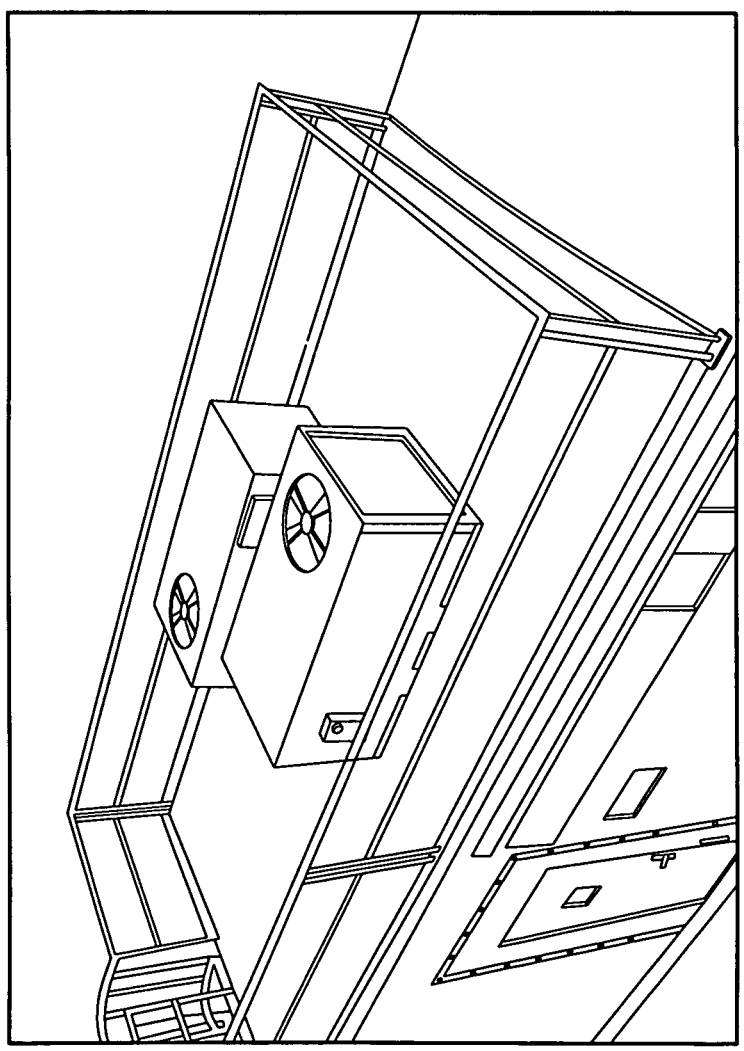
FIGS. 13A and B depict front view of an illustrative embodiment of the invention having redundant roof mounted A/C with safety railing and access ladder with safety backscratcher.
Figure 13B:
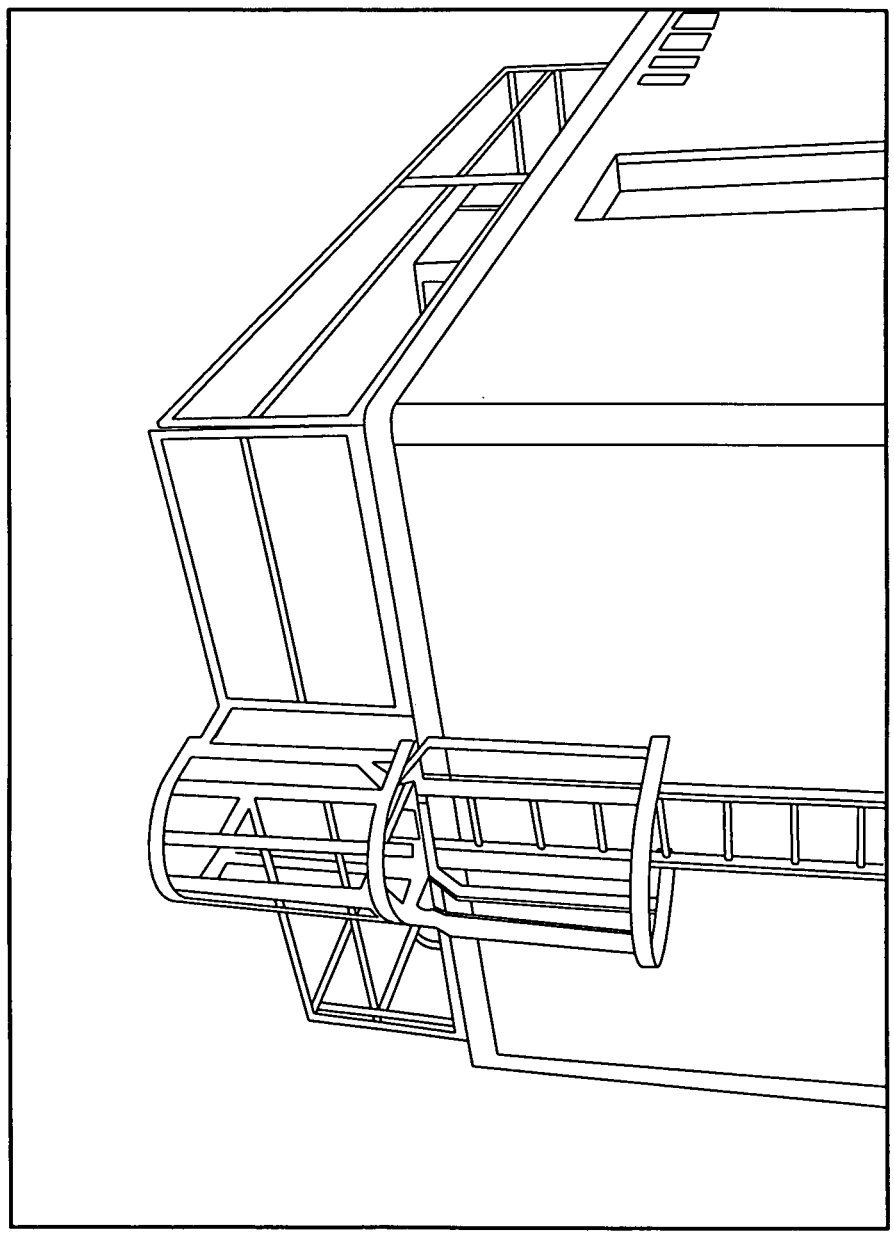

FIG. 13 depicts an illustrative embodiment of the invention having module housing redundant roof mounted A/C with safety railing and access ladder with safety backscratcher.

Figure 14A:
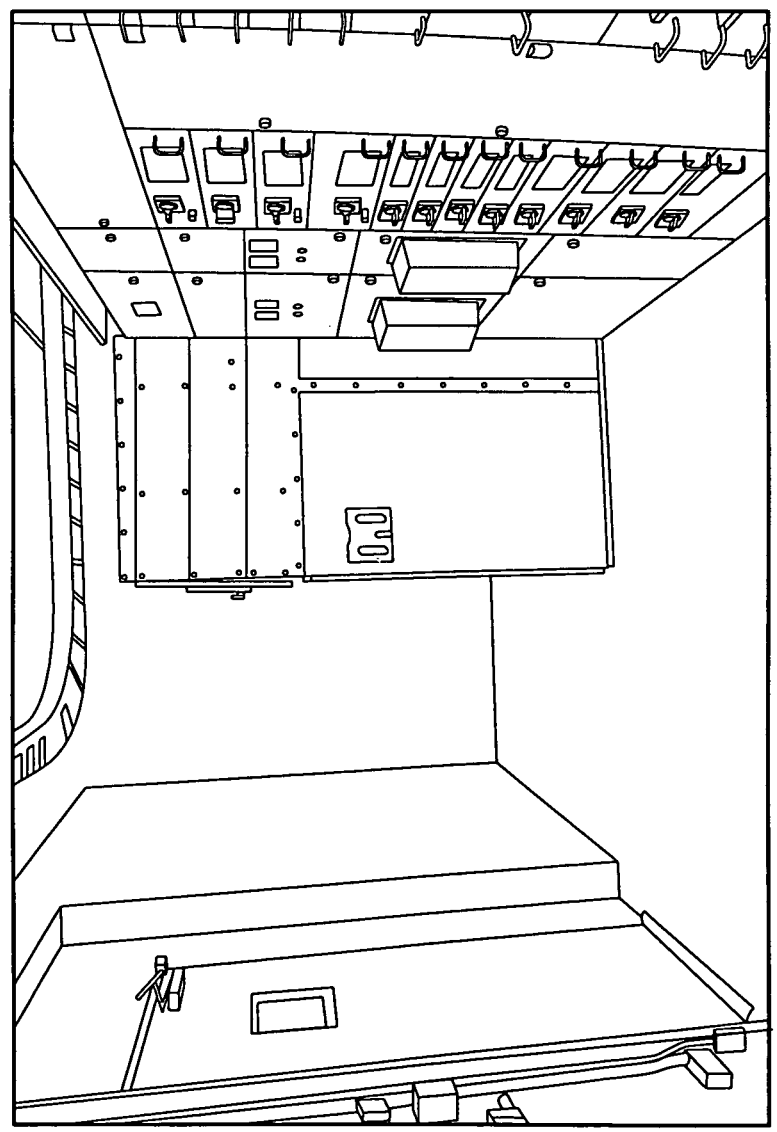
FIGS. 14A and B depict an internal view of illustrative embodiment of the invention of a 6 kV and 440 volt AC switchgear and Motor Control Centers inside the power module.
Figure 14B:
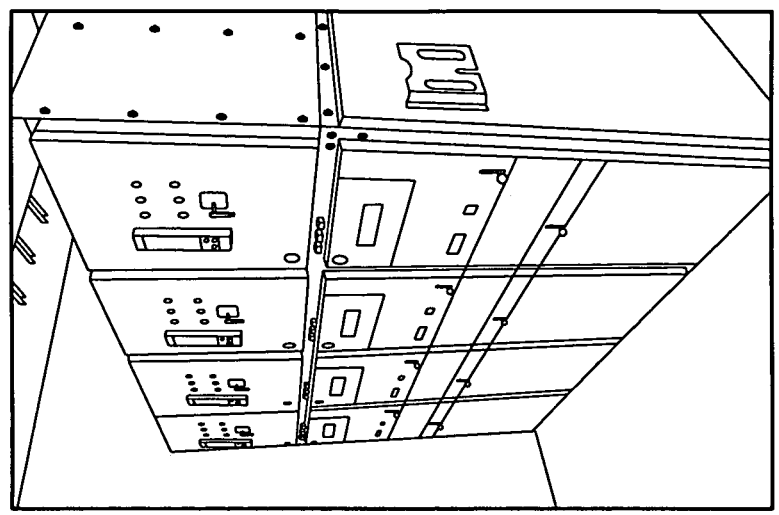

FIG. 14 depicts an illustrative embodiment of the invention of a 6 kV and 440 volt AC switchgear and Motor Control Centers inside EPR power module.

Figure 15:
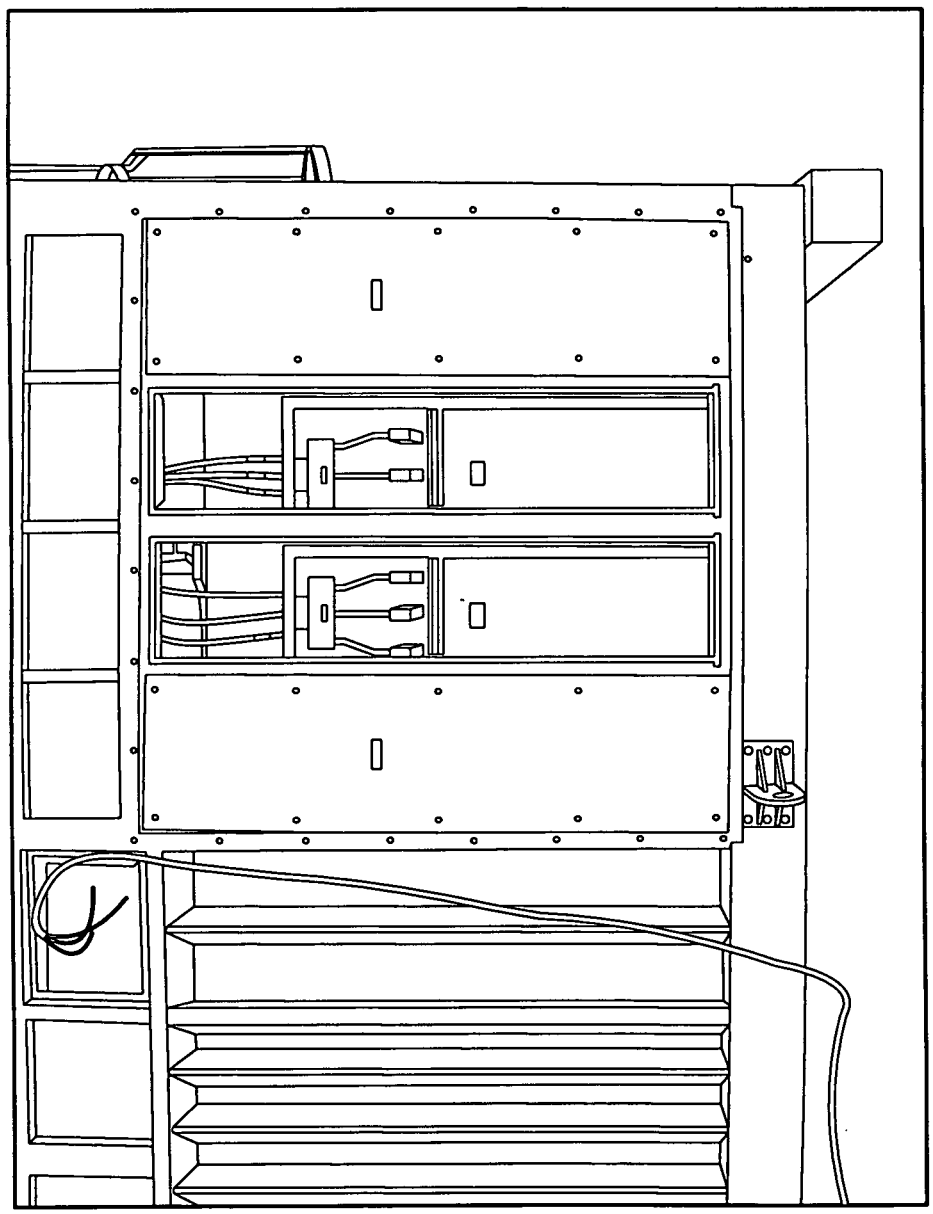
FIG. 15 depicts a front view of an illustrative embodiment of the invention of a 6 kV customer incoming and outgoing connections are made external to the module.

FIG. 15 depicts an illustrative embodiment of the invention of a 6 kV customer incoming and outgoing connections are made external to the module housing.

Figure 16:
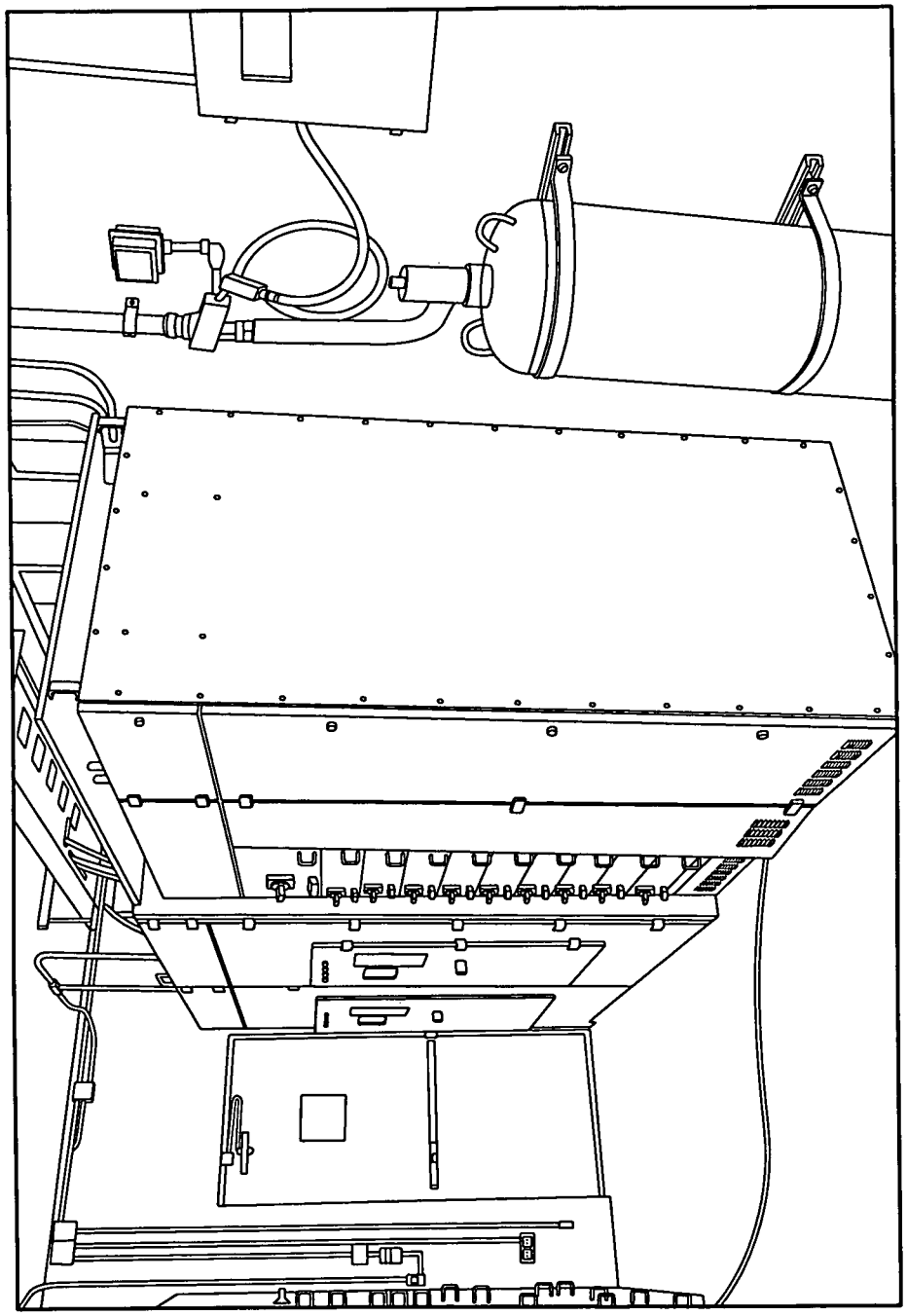
FIG. 16 depicts an internal view of illustrative embodiment of the invention having an integrated 6 kV Solid State Starters with 480 volt Emergency MCC and CO2 fire suppression system.

FIG. 16 depicts an illustrative embodiment of the invention having an integrated 6 kV Solid State Starters with 480 volt Emergency MCC and CO2 fire suppression system in a module housing.

Figure 17:
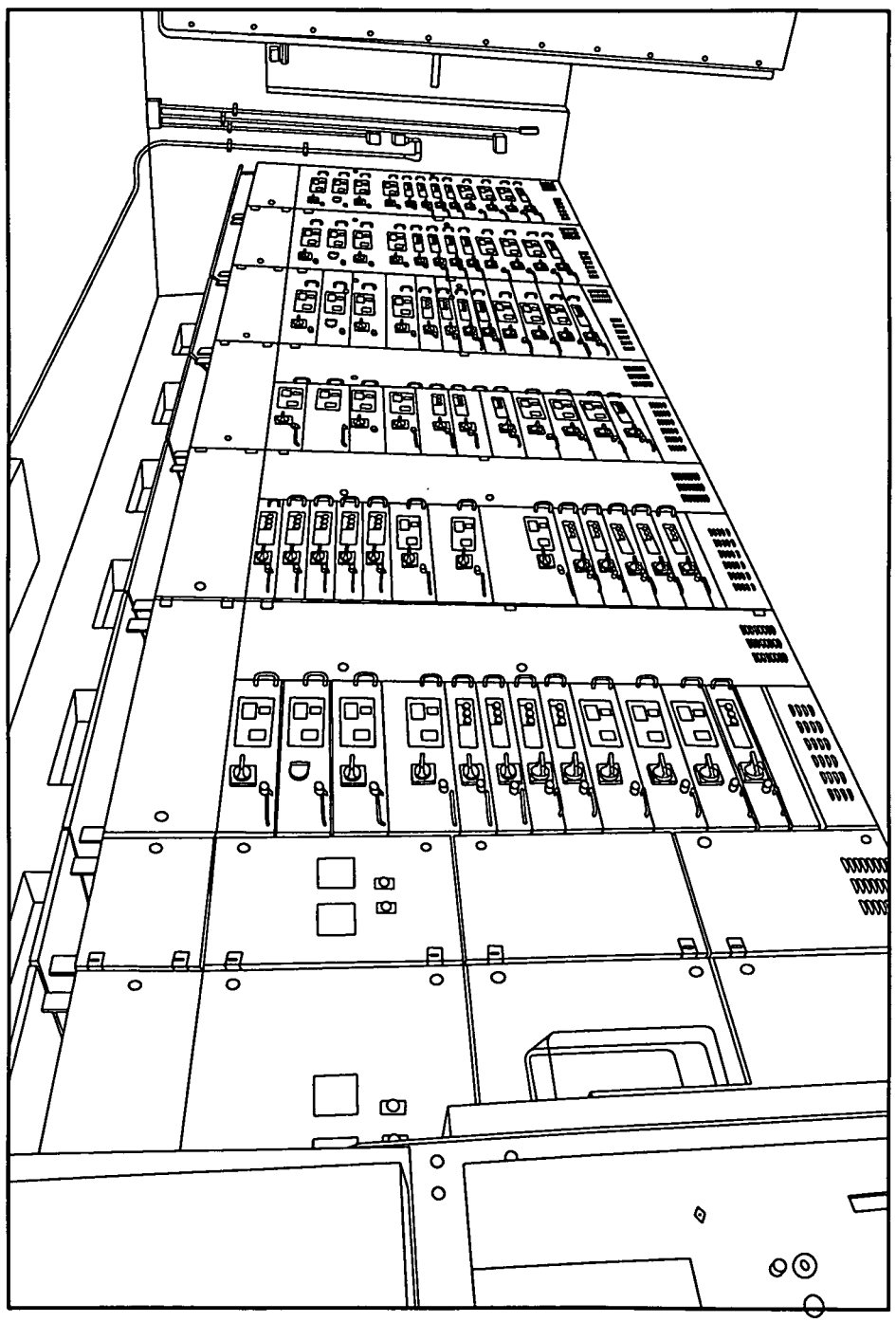
FIG. 17 depicts internal view of an illustrative embodiment of the invention having an integrated 440 volt Motor Control Center.

FIG. 17 depicts an illustrative embodiment of the invention having an integrated 440 volt Motor Control Center in a module housing.

Figure 18:
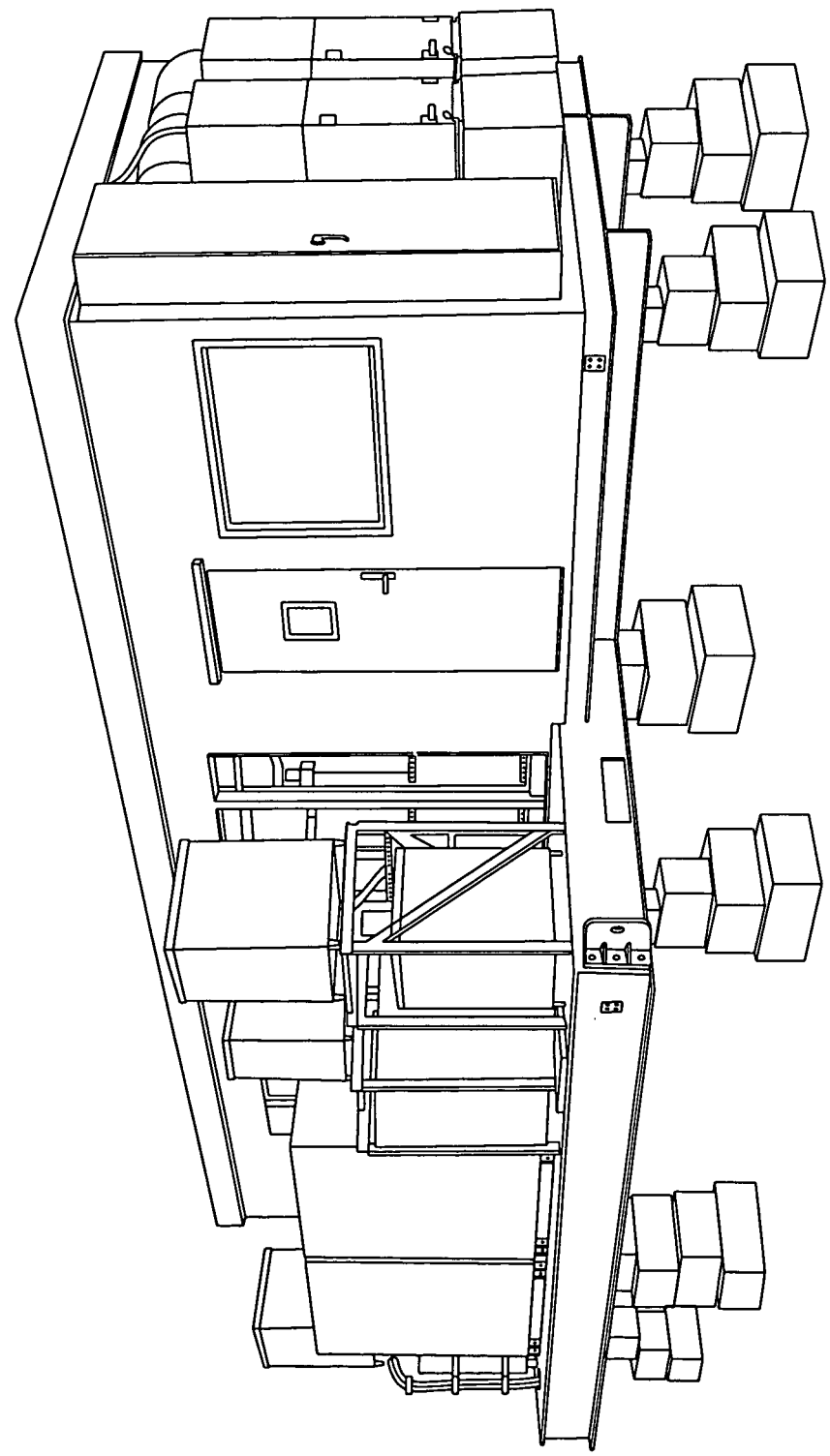
FIG. 18 depicts a front view of an illustrative embodiment of the invention having an interlocking panel design power and control module with redundant wall mounted A/C, integrated transformer porch and field viewing window.

FIG. 18 depicts an illustrative embodiment of the invention having an interlocking panel design power and control module with redundant wall mounted A/C, integrated transformer porch and field viewing window in a module housing.

Figure 19:
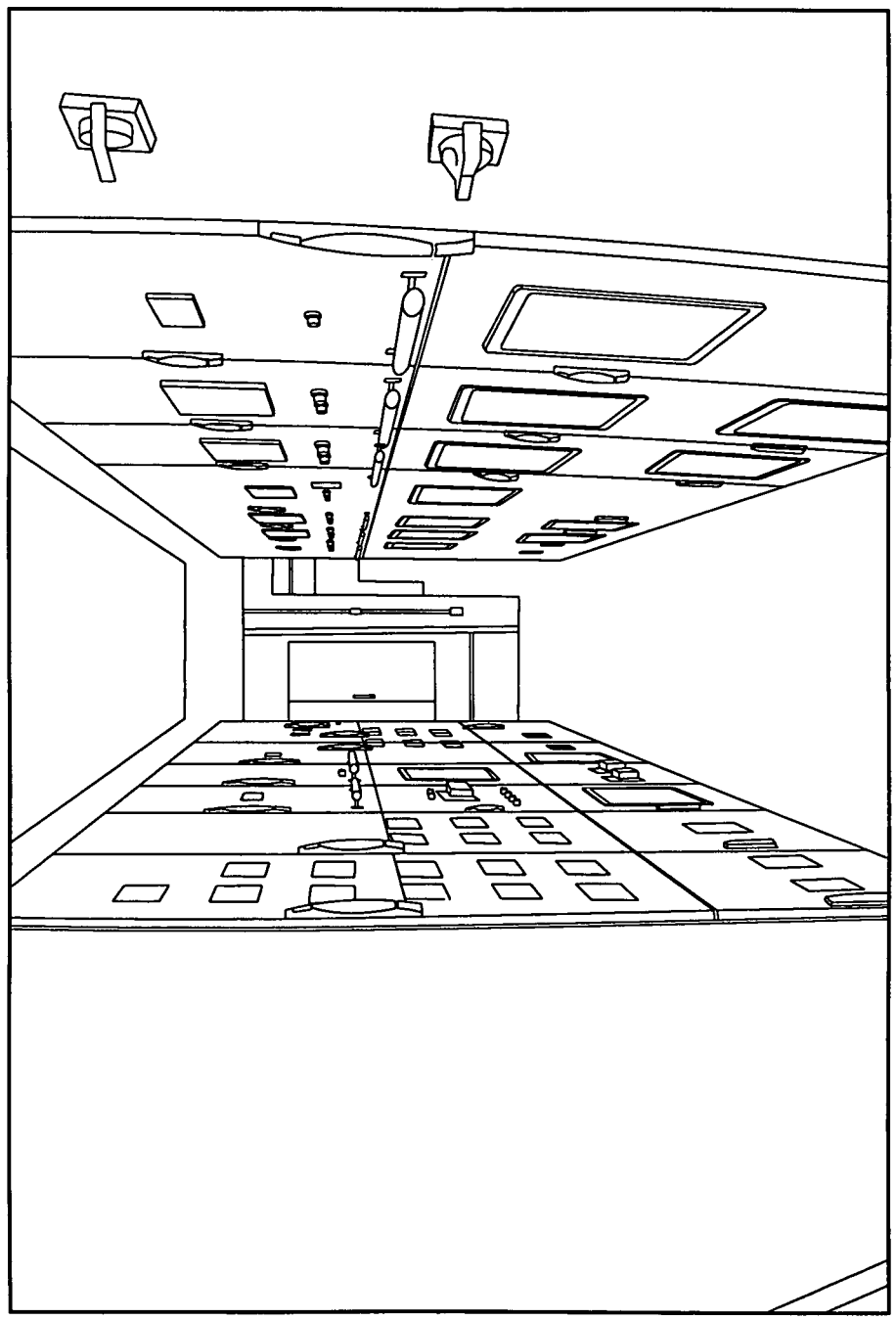
FIG. 19 depicts internal view of an illustrative embodiment of the invention having an integrated 690 volt power generation switchboard, 440 volt distribution switchboard and vessel automation I/O.

FIG. 19 depicts an illustrative embodiment of the invention having an integrated 690 volt power generation switchboard, 440 volt distribution switchboard and vessel automation I/O inside a module housing.

Figure 20A:
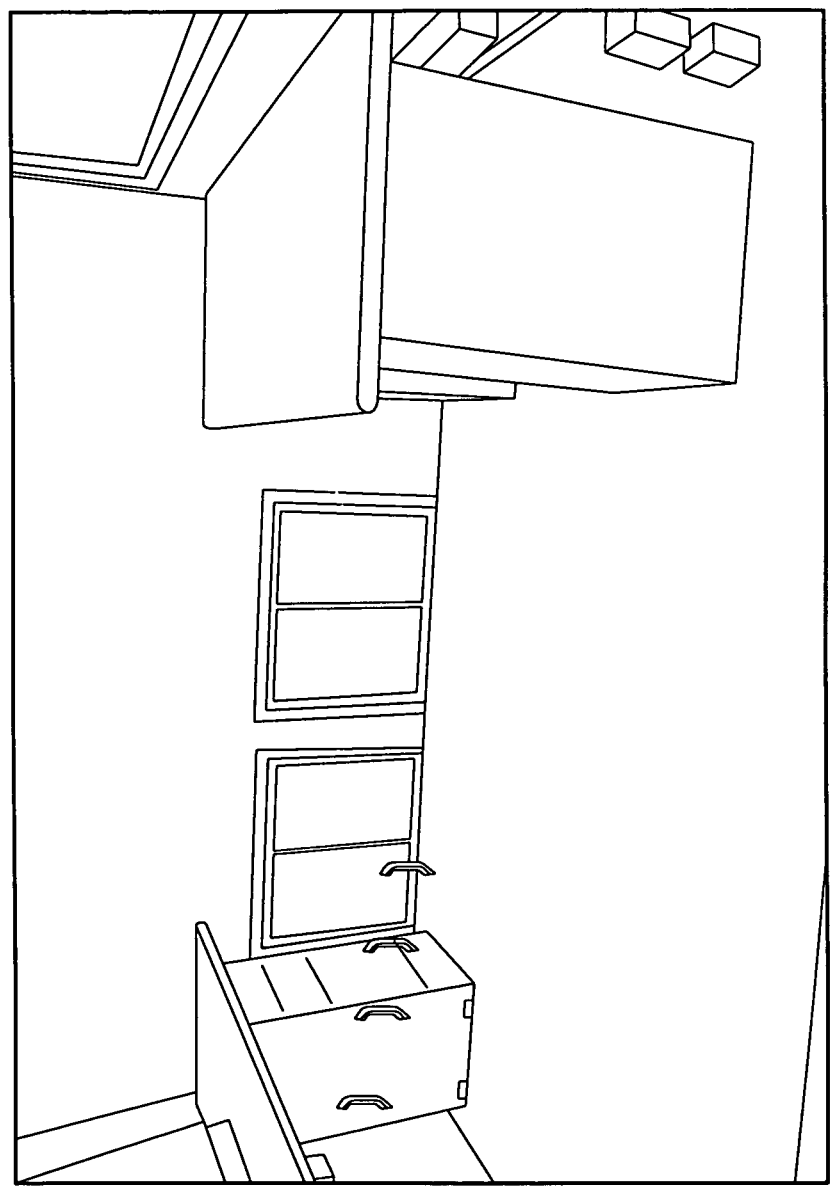
FIGS. 20A and 20B depict an illustrative embodiment of the invention having a control desk for redundant vessel automation computer system.
Figure 20B:
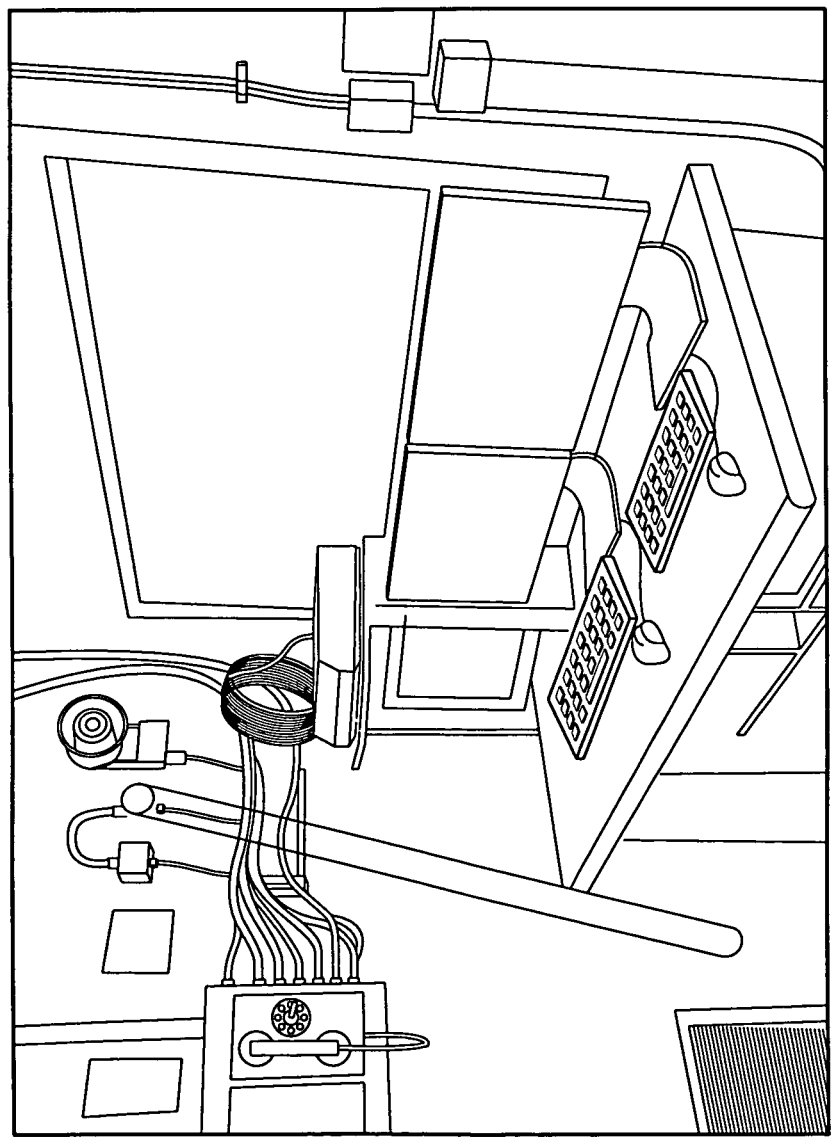

FIG. 20 depicts an illustrative embodiment of the invention having a control desk for redundant vessel automation computer system inside of a module housing.

Figure 21A:
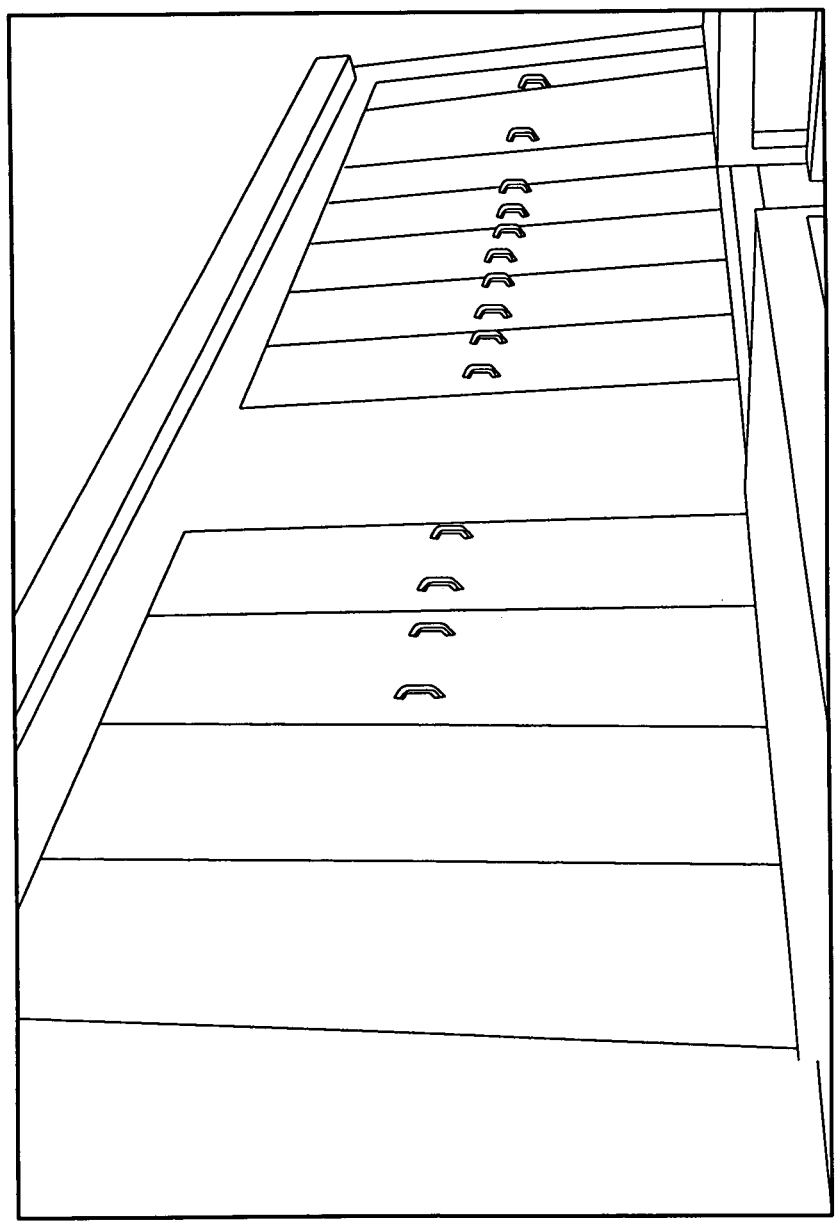
FIGS. 21A and 21B depict an illustrative embodiment of the invention an exterior removable covers for shipyards power connections to all switchboard. The shipyard does not access the inside of the module. This keeps the internal electrical equipment safe and clean during installation at the shipyard. Reducing onsite commissioning time and cost.
Figure 21B:
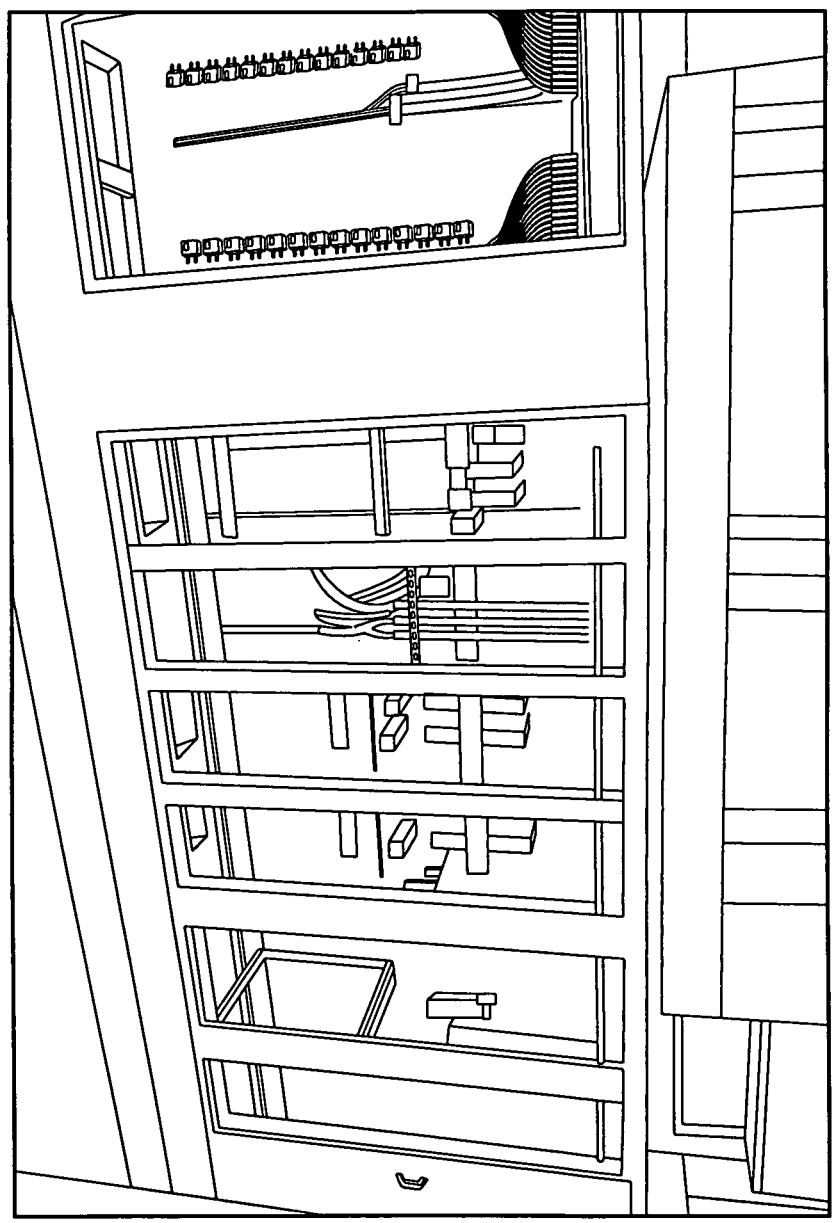

FIG. 21 depicts an illustrative embodiment of the invention an exterior removable covers for shipyards power connections to all switchboard inside of a module housing. The shipyard does not access the inside of the module housing. This keeps the internal electrical equipment safe and clean during installation at the shipyard. Reducing onsite commissioning time and cost.

Figure 22:
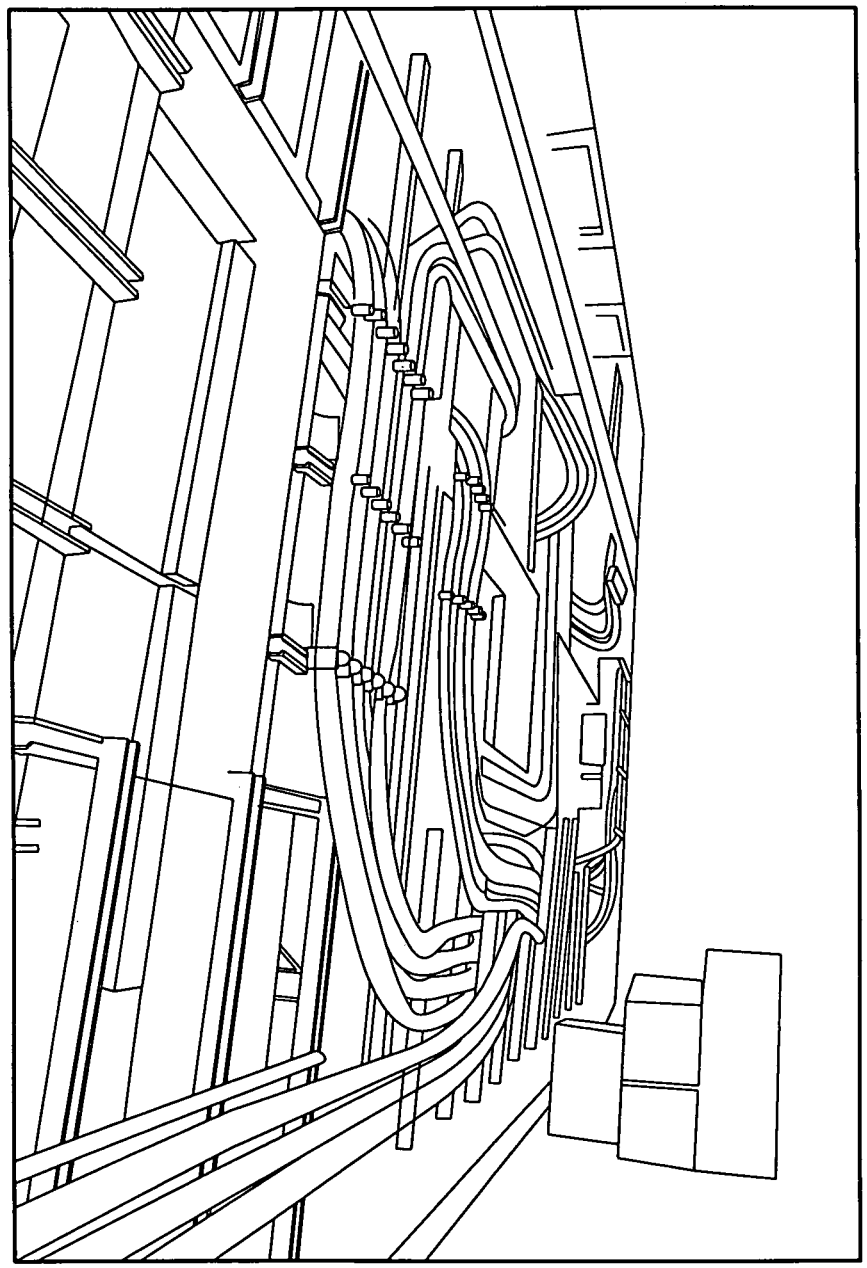
FIG. 22 depicts an illustrative embodiment of the invention an exterior having installed power cables run underneath the power module and terminated between switchboard and porch transformers.
Figure 23B:
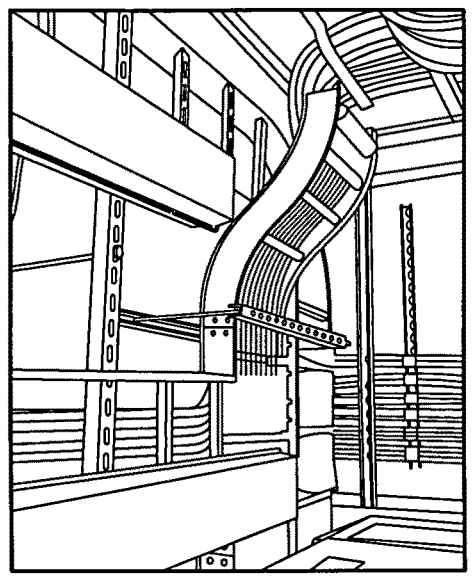
FIGS. 23A and 23B depict an illustrative embodiment of the invention an exterior installed control cables run in cable tray internal to the module. All internal controls are interconnected and brought out to a central marshalling panel for shipyard connections. This greatly reduces shipyard time and cost. These connections are checked and system tested at the factory.
Figure 23A:
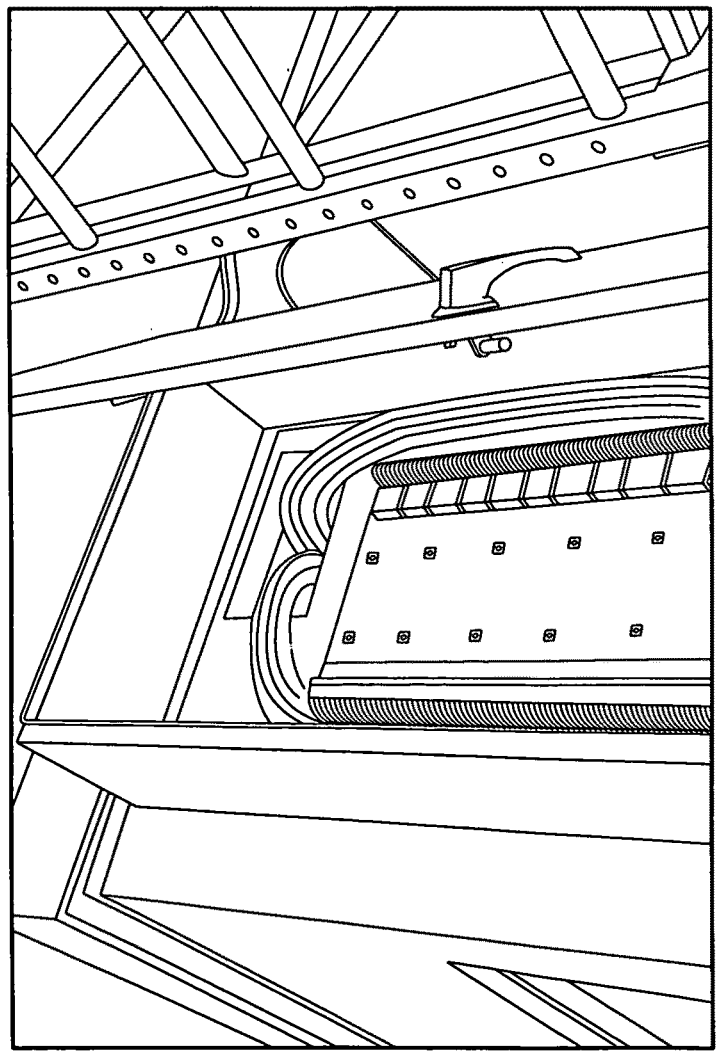

FIG. 22 depicts an illustrative embodiment of the invention an exterior having installed power cables run underneath the power module housing and terminated between switchboard and porch transformers. FIG. 23 depicts an illustrative embodiment of the invention an exterior installed control cables run in cable tray internal to the module housing. All internal controls are interconnected and brought out to a central control cable marshalling panel for shipyard connections. This greatly reduces shipyard time and cost. These connections are checked and system tested at the factory.

Figure 24:
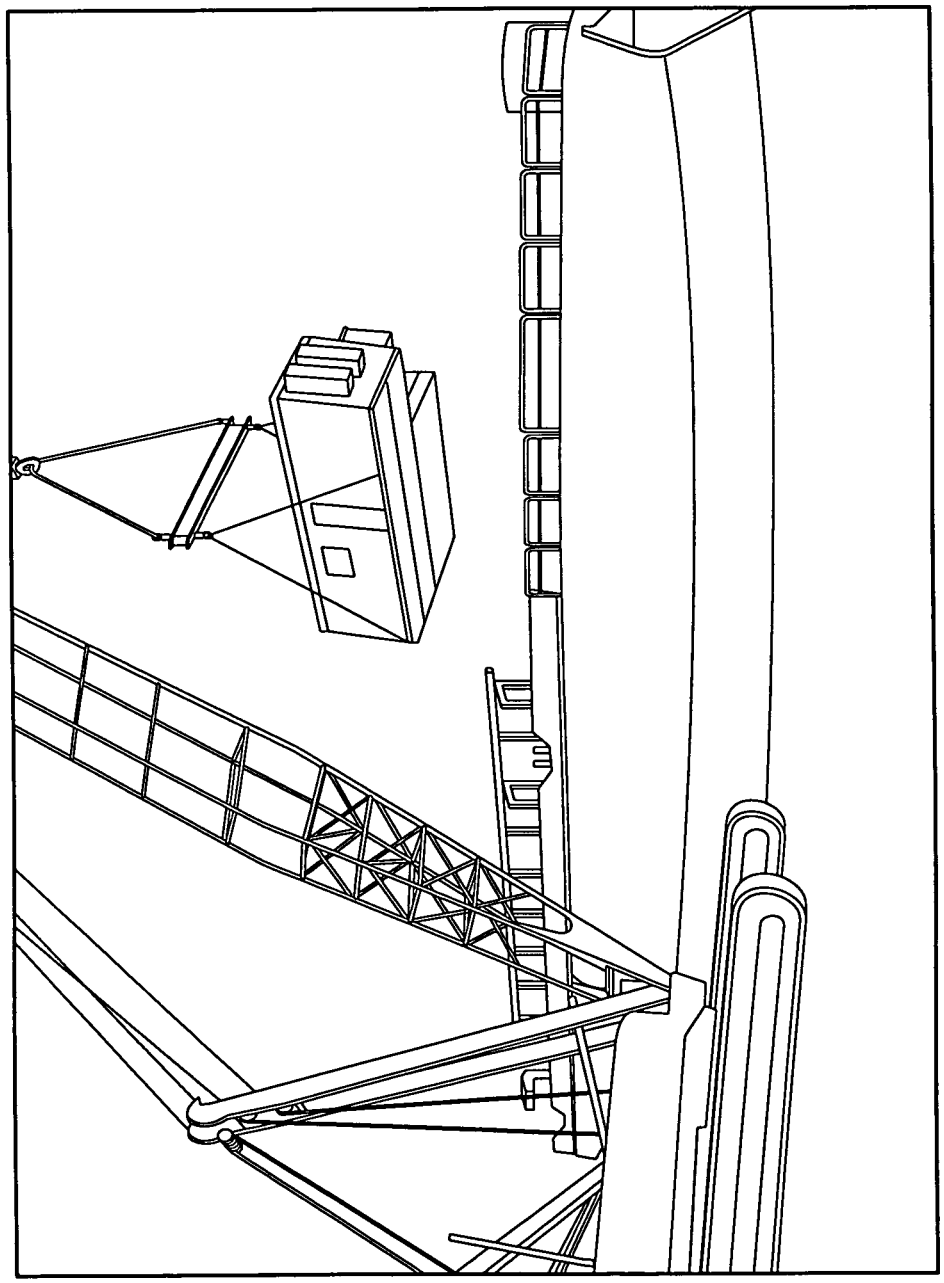
FIG. 24 depicts a front view of an illustrative embodiment of the invention an exterior having a power Module being lowered into place by the shipyard onboard a marine offshore support vessel.
Figure 25:
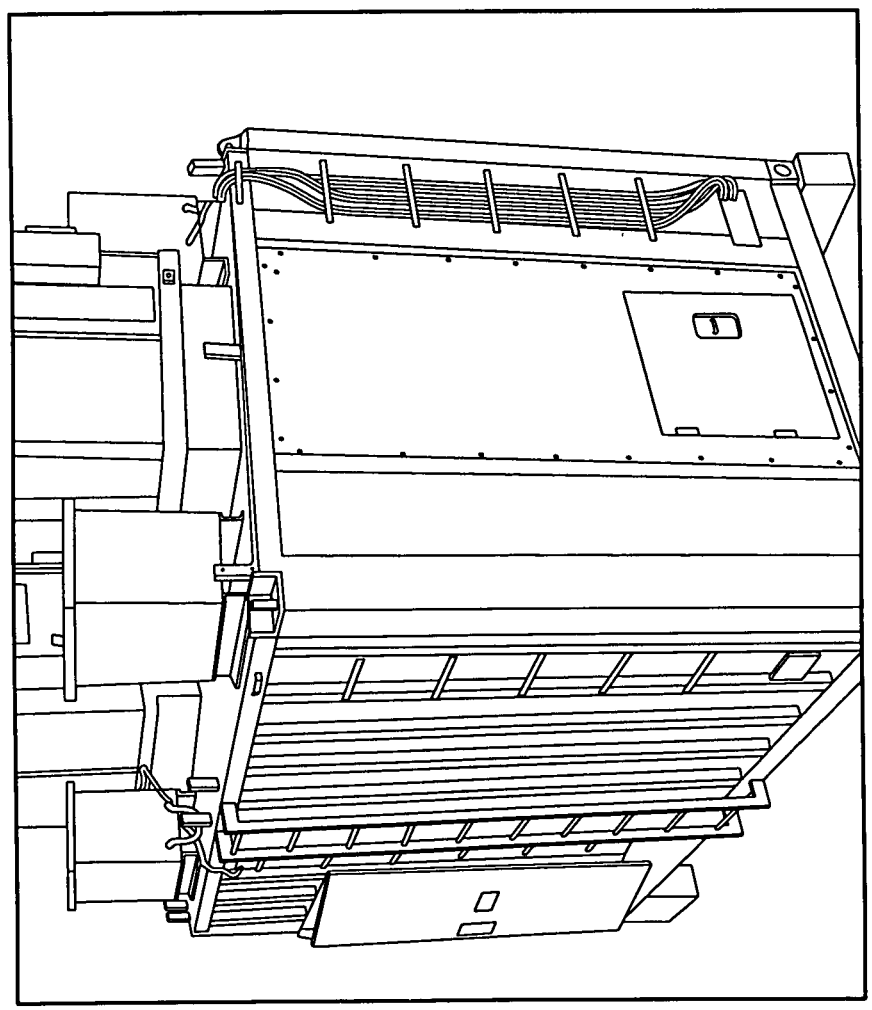
FIG. 25 depicts a front view of an illustrative embodiment of the invention having an exterior ABS Certified 1200 kW AC Top Drive House Complete.
Figure 26:
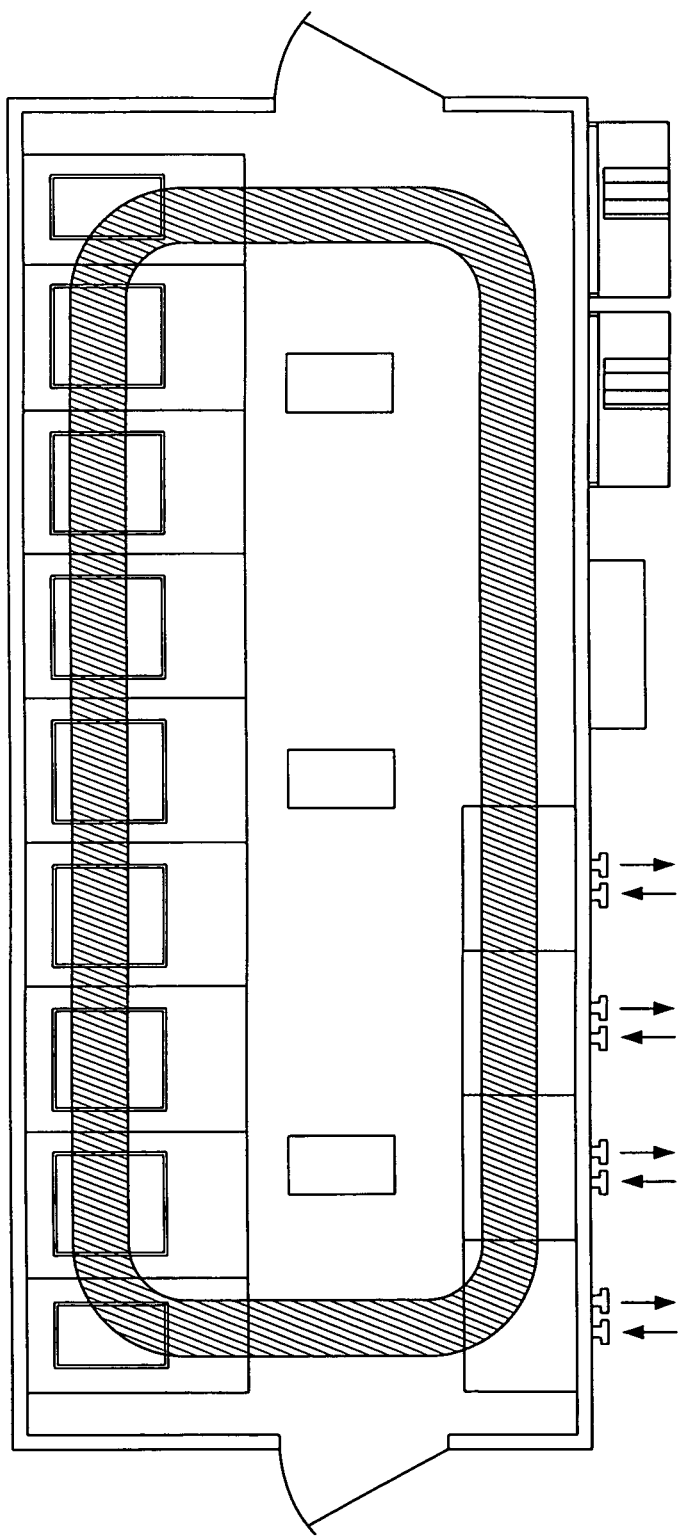
FIG. 26 depicts a plan view of an illustrative embodiment of the invention having an exterior a general arrangement schematic drawing for a 690 Volt power generator (EPR)
Figure 27:
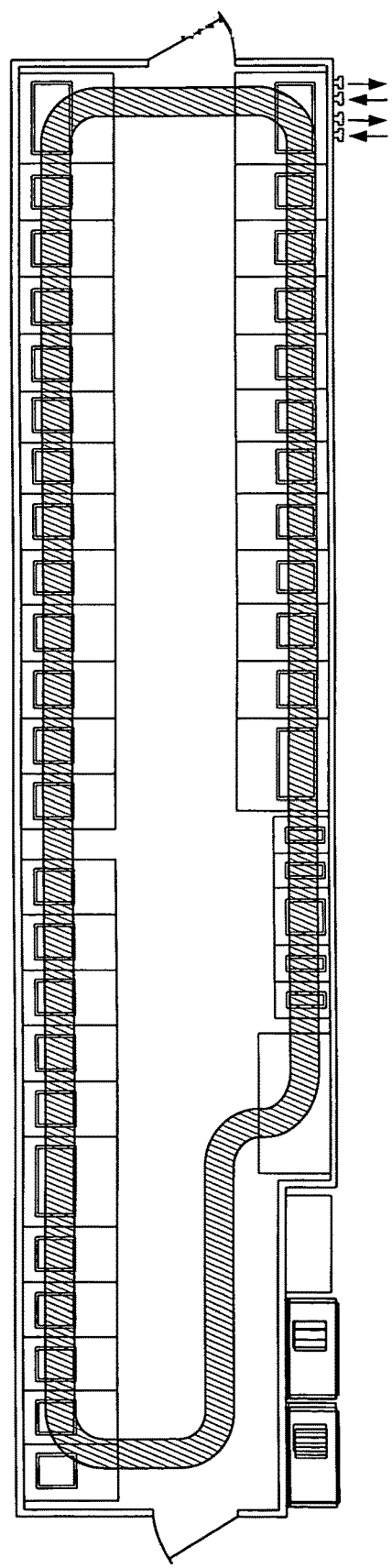
FIG. 27 depicts a plan view of an illustrative embodiment of the invention an exterior a general arrangement schematic drawing for a 480 Volt power generator EPR.
Figure 28:
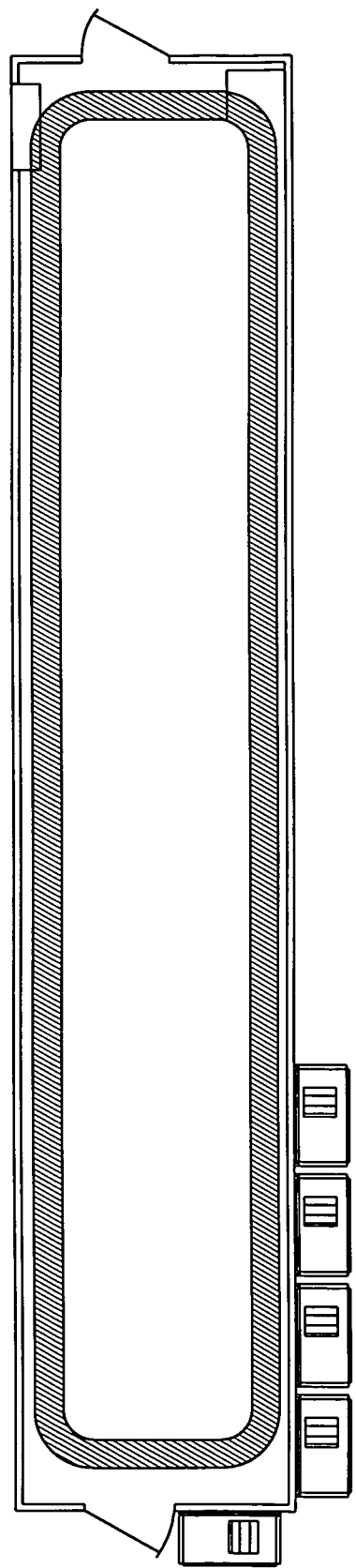
FIG. 28 depicts a plan view of an illustrative embodiment of the invention having an exterior a general arrangement schematic drawing for a 690 V drilling drive & 480 V 230 V RIG SERVICE EPR.

FIG. 24 depicts an illustrative embodiment of the invention an exterior having a power Module housing being lowered into place by the shipyard onboard a marine offshore support vessel. FIG. 25 depicts an illustrative embodiment of the invention having an exterior ABS Certified 1200 kW AC Top Drive House Complete. FIG. 26 depicts an illustrative embodiment of the invention having an exterior a general arrangement schematic drawing for a 690 Volt power generator (EPR) module housing. FIG. 27 depicts an illustrative embodiment of the invention an exterior a general arrangement schematic drawing for a 480 Volt power generator EPR module housing. FIG. 28 depicts an illustrative embodiment of the invention having an exterior a general arrangement schematic drawing for a 690 V drilling drive & 480 V 230 V RIG SERVICE EPR module housing.

The foregoing examples of illustrative embodiments are for purposes of example only and is not intended to limit the scope of the invention. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a non-transitory machine readable storage medium containing instructions, so that a device connected to a network environment can send or receive voice, video or data, and to communicate over the network using the instructions. The instructions may further be transmitted or received over a network via the network interface device. The non-transitory machine readable storage medium may also contain a data structure for containing data useful in providing a functional relationship between the data and a machine or computer in an illustrative embodiment of the disclosed system and method.

While the non-transitory computer-readable storage medium is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. The figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computerized method for building a modular electrical system for a jack up rig, the method comprising:
   identifying rig equipment on the jack up rig that will be connected to the modular electrical system;
   selecting electrical equipment to control the rig equipment;
   placing the electrical equipment in an electrical module;
   electrically connecting the electrical equipment to power cables and control cables inside of the electrical module;
   inputting design parameters to a module design computer, the design parameters comprising shape parameter dimensions into which each of the modules is placed;
   determining in and output from the module design computer a module design having a shape in accordance with the shape parameter dimension wherein the module shape conforms to the structural environment into which the module is placed; and
   testing the electrical equipment inside of the electrical module from outside of the electrical module, wherein the design parameters further comprise:
   physical space, size and volume limits and wherein the module design has a physical space, size and volume in accordance with the physical space, size and volume limits, the method further comprising:
   locking an electrical module and shipping the module to the jack up rig; and
   connecting rig equipment to the outside of the locked electrical module;
   the method further comprising:
   wherein the shape design parameter comprises a ship hull shape, wherein the computer program fits the module shape into the existing shape of the ship's hull where in the module becomes an integral part of the ship's hull and outputs the module shape to a design computer output device;
   connecting the control cables for the electrical control equipment to a control cable marshaling panel inside of the electrical module;
   connecting the power cables for the electrical control equipment to a power panel inside of the electrical module;
   connecting control cables connected to control test equipment simulating the rig equipment to the control cable marshaling panel thereby providing control connectivity between the electrical equipment inside of the electrical module and the test equipment;
   connecting power cables connected to a power test equipment simulating rig equipment to the power panel thereby providing power connectivity between the electrical equipment inside of a power test rig equipment; and
   certifying that the test module is working properly before shipping the electrical module for installation.

2. The method of claim 1, the method further comprising:
   inputting a load bearing module roof design parameter;
   determining in and output from the module design computer a propose module design having a load bearing capacity in accordance with the load bearing module roof design parameter;
   inputting a module design parameter for a module weight;
   determining in and output from the module design computer a propose module design having a weight in accordance the module weight design parameter;
   input to the module design computer a lifting capacity design parameter of a crane on the jack up rig;
   determining in and output from the module design computer a module design having a weight that is less that the lifting capacity design parameter;
   connecting the control cables for an electrical control equipment to a control cable marshaling panel inside of the electrical module;
   connecting the power cables for the electrical control equipment to a power panel inside of the electrical module;
   connecting control cables connected to the rig equipment to the control cable marshaling panel thereby providing control connectivity between the electrical equipment inside of the electrical module and the rig equipment; and
   connecting power cables connected to the rig equipment to the power panel thereby providing power connectivity between the electrical equipment inside of a rig equipment.

3. The method of claim 2, the method further comprising:
   inputting a module weight design parameter for a jack up rig module comprising a current jack up rig weight and a maximum jack up rig weight for to keep the jack up rig module light enough so that the added weight of the module does not exceed the maximum jack up rig weight; and
   determining in and output from the module design computer a module design having a weight that is less than the maximum jack up rig weight.

4. The method of claim 3, wherein the design parameters further comprise an identification of existing equipment inside the electrical module, the method further comprising:
   determining in and output for the module computer, a module design minimizing electrical cable connection run lengths between equipment inside of the module and electrical interference between equipment inside of the module, minimizing electrical cable connection runs length and electrical interference between equipment in the module.

5. The method of claim 3, the method further comprising:
   inputting to the module design computer a list of equipment outside of the module to which the module connects; and
   determining in and output from the module design computer a module design having cable connection paths substantially minimizing cable lengths between equipment inside and outside of the module, minimizing electrical cable connection runs length and electrical interference between a module and existing equipment outside of the module.

6. The method of claim 3 further comprising:
   inputting to the module design computer a temperature design parameter for equipment inside and outside of a module;
   instructions to determine in and output to the module design computer a module design addressing the temperature design parameter of equipment inside and outside of a module;

outputting to the module design computer a layout that substantially minimizes electrical interference between equipment inside of a module and electrical interference between equipment inside of a module and equipment outside of a module; and outputting from the module design computer a module design that addresses accessibility to equipment for equipment install, repair and control inside of the module and accessibility to equipment in the module for equipment install, repair and control of the equipment inside of the module.

\* \* \* \* \*